(12) United States Patent
Endo et al.

(10) Patent No.: US 12,195,107 B2
(45) Date of Patent: Jan. 14, 2025

(54) CONTROL DEVICE, ELECTRIC POWER STEERING DEVICE, AND CONTROL METHOD

(71) Applicant: Nidec Corporation, Kyoto (JP)

(72) Inventors: Shuji Endo, Kyoto (JP); Sohei Miyake, Kyoto (JP); Masaya Ishikawa, Kyoto (JP); Daisuke Notsu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 202 days.

(21) Appl. No.: 18/086,285

(22) Filed: Dec. 21, 2022

(65) Prior Publication Data

US 2023/0202554 A1 Jun. 29, 2023

(30) Foreign Application Priority Data

Dec. 28, 2021 (JP) .................................. 2021-214884

(51) Int. Cl.
*B62D 5/04* (2006.01)
*B62D 6/10* (2006.01)
*B62D 23/00* (2006.01)
*H02P 23/00* (2016.01)

(52) U.S. Cl.
CPC ......... *B62D 5/0463* (2013.01); *B62D 5/0421* (2013.01); *H02P 23/0022* (2013.01)

(58) Field of Classification Search
CPC ................................ B62D 5/0463; B62D 6/10
See application file for complete search history.

(56) References Cited

U.S. PATENT DOCUMENTS

| 2010/0001824 | A1* | 1/2010 | Chen ....................... H01F 30/02 336/200 |
| 2017/0158228 | A1* | 6/2017 | She ........................ B62D 5/0463 |
| 2018/0111642 | A1* | 4/2018 | Endo ....................... B62D 6/008 |
| 2019/0252972 | A1* | 8/2019 | Minaki ..................... H02P 6/10 |
| 2019/0263446 | A1* | 8/2019 | Tsubaki .................... B62D 6/00 |
| 2019/0337553 | A1* | 11/2019 | Minaki ..................... H02P 21/05 |
| 2020/0010111 | A1* | 1/2020 | Tsubaki ................. B62D 5/0463 |

FOREIGN PATENT DOCUMENTS

JP 2018-183046 A 11/2018

* cited by examiner

*Primary Examiner* — Long T Tran
(74) *Attorney, Agent, or Firm* — Keating & Bennett, LLP

(57) ABSTRACT

A control device that controls a control target including at least a motor in a steering mechanism including an input shaft to which a steering wheel is connected, an output shaft connected to the input shaft via a torsion bar, and the motor connected to the output shaft. The control device includes a reaction force controller to generate an input torque input to the control target based on a torsion bar torque generated in the torsion bar and to control a reaction force transmitted from the steering wheel to the steering person, and an assist controller to generate a correction torque to correct the input torque based on an output of the control target and a nominal model. The assist controller is configured or programmed such that a transfer function of the control target is constrained by a transfer function of the nominal model in a frequency band.

20 Claims, 12 Drawing Sheets

CONTROL DEVICE, ELECTRIC POWER STEERING DEVICE, AND CONTROL METHOD

CROSS-REFERENCE TO RELATED APPLICATIONS

The present application claims priority under 35 U.S.C. § 119 to Japanese Patent Application No. 2021-214884, filed on Dec. 28, 2021, the entire contents of which are hereby incorporated herein by reference.

1. FIELD OF THE INVENTION

The present disclosure relates to a control device, an electric power steering device, and a control method.

2. BACKGROUND

An electric power steering system mounted on a vehicle is known. For example, an electric power steering system conventionally includes a motor control device including a disturbance observer that estimates a disturbance torque.

In the electric power steering system as described above, it is required to improve a steering feeling felt by a steering person who steers a steering wheel of a vehicle. However, in the control system of the electric power steering system, each element of the stability, the disturbance suppression characteristic, and the responsiveness has a trade-off relationship with each other. Therefore, there is a problem that it is difficult to adjust each element and it is difficult to improve the steering feeling felt by the steering person who steers the steering wheel of the vehicle.

SUMMARY

One example embodiment of a control device of the present disclosure is a control device that controls a control target including at least a motor in a steering mechanism including an input shaft to which a steering wheel steered by a steering person is connected, an output shaft connected to the input shaft via a torsion bar, and the motor connected to the output shaft. The control device includes a reaction force controller to generate an input torque input to the control target based on a torsion bar torque generated in the torsion bar and to control a reaction force transmitted from the steering wheel to the steering person, and an assist controller to generate a correction torque to correct the input torque based on an output of the control target and a nominal model. The assist controller is configured or programmed such that a transfer function of the control target is constrained by a transfer function of the nominal model in a frequency band where a gain in a gain characteristic of a complementary sensitivity function with respect to a modeling error between the control target and the nominal model is approximately 1. The nominal model is a model in which mechanical characteristics when the steering person steers the steering wheel are considered.

One example embodiment of the present disclosure is a control device that controls a control target including at least a motor in a steering mechanism including an input shaft to which a steering wheel steered by a steering person is connected, an output shaft connected to the input shaft via a torsion bar, and the motor connected to the output shaft, the control device including a reaction force controller to generate an input torque input to the control target based on a torsion bar torque generated in the torsion bar and to control a reaction force transmitted from the steering wheel to the steering person, and an assist controller to generate a correction torque to correct the input torque based on an output of the control target and a nominal model. The assist controller is configured or programmed such that a transfer function of the control target is constrained by a transfer function of the nominal model in a frequency band where a gain in a gain characteristic of a complementary sensitivity function with respect to a modeling error between the control target and the nominal model is approximately 1. An order of the transfer function of the nominal model is 3 or more.

One example embodiment of a control device of the present disclosure is a control device that controls a control target including at least a motor in a steering mechanism including an input shaft to which a steering wheel steered by a steering person is connected, an output shaft connected to the input shaft via a torsion bar, and the motor connected to the output shaft, the control device including a reaction force controller to generate an input torque input to the control target based on a torsion bar torque generated in the torsion bar and to control a reaction force transmitted from the steering wheel to the steering person, and an assist controller to generate a correction torque to correct the input torque based on an output of the control target and a nominal model. The assist controller is configured or programmed such that a transfer function of the control target is constrained by a transfer function of the nominal model in a frequency band where a gain in a gain characteristic of a complementary sensitivity function with respect to a modeling error between the control target and the nominal model is approximately 1. The nominal model is a model having frequency characteristics between a one-inertia system and a two-inertia system.

One example embodiment of an electric power steering device of the present disclosure includes the control device and the steering mechanism.

One example embodiment of a control method of the present disclosure is a control method for controlling a control target including at least a motor in a steering mechanism including an input shaft to which a steering wheel steered by a steering person is connected, an output shaft connected to the input shaft via a torsion bar, and the motor connected to the output shaft. The control method includes generating an input torque input to the control target based on a torsion bar torque generated in the torsion bar and controlling a reaction force transmitted from the steering wheel to the steering person, and generating a correction torque to correct the input torque based on an output of the control target and a nominal model. The generating of the correction torque includes constraining a transfer function of the control target by a transfer function of the nominal model in a frequency band where a gain in a gain characteristic of a complementary sensitivity function with respect to a modeling error between the control target and the nominal model is approximately 1. The nominal model is a model in which mechanical characteristics when the steering person steers the steering wheel are considered.

One example embodiment of a control method of the present disclosure is a control method for controlling a control target including at least a motor in a steering mechanism including an input shaft to which a steering wheel steered by a steering person is connected, an output shaft connected to the input shaft via a torsion bar, and the motor connected to the output shaft. The control method includes generating an input torque input to the control target based on a torsion bar torque generated in the torsion bar and controlling a reaction force transmitted from the steering wheel to the steering person, and generating a correction torque to correct the input torque based on an output of the control target and a nominal model. The generating of the correction torque includes constraining a transfer function of the control target by a transfer function of the nominal model in a frequency band where a gain in a gain characteristic of a complementary sensitivity function with respect to a modeling error between the control target and the nominal model is approximately 1. An order of a transfer function of the nominal model is 3 or more.

One example embodiment of a control method of the present disclosure is a control method for controlling a control target including at least a motor in a steering mechanism including an input shaft to which a steering wheel steered by a steering person is connected, an output shaft connected to the input shaft via a torsion bar, and the motor connected to the output shaft. The control method includes generating an input torque input to the control target based on a torsion bar torque generated in the torsion bar and controlling a reaction force transmitted from the steering wheel to the steering person, and generating a correction torque to correct the input torque based on an output of the control target and a nominal model. The generating of the correction torque includes constraining a transfer function of the control target by a transfer function of the nominal model in a frequency band where a gain in a gain characteristic of a complementary sensitivity function with respect to a modeling error between the control target and the nominal model is approximately 1. The nominal model is a model having frequency characteristics between a one-inertia system and a two-inertia system.

The above and other elements, features, steps, characteristics and advantages of the present disclosure will become more apparent from the following detailed description of the example embodiments with reference to the attached drawings.

DETAILED DESCRIPTION

Hereinafter, example embodiments of control devices, electric power steering devices, and control methods according to the present disclosure will be described with reference to the accompanying drawings. However, needlessly detailed descriptions may be omitted. For example, detailed descriptions of well-known matters and duplicate description of substantially the same configuration may be omitted. This is to avoid unnecessary redundancy of the following description and to facilitate the understanding of those skilled in the art.

The following example embodiments are illustrative, and the control devices and the control methods for electric power steering devices according to the present disclosure are not limited to the following example embodiments. For example, the numerical values, the steps, the order of the steps, and the like illustrated in the following example embodiments are only illustrative, and various modifications can be made unless any technical inconsistency occurs. The example embodiments or examples described below are merely exemplary, and various combinations are possible as long as no technical contradiction occurs.

Figure 1:
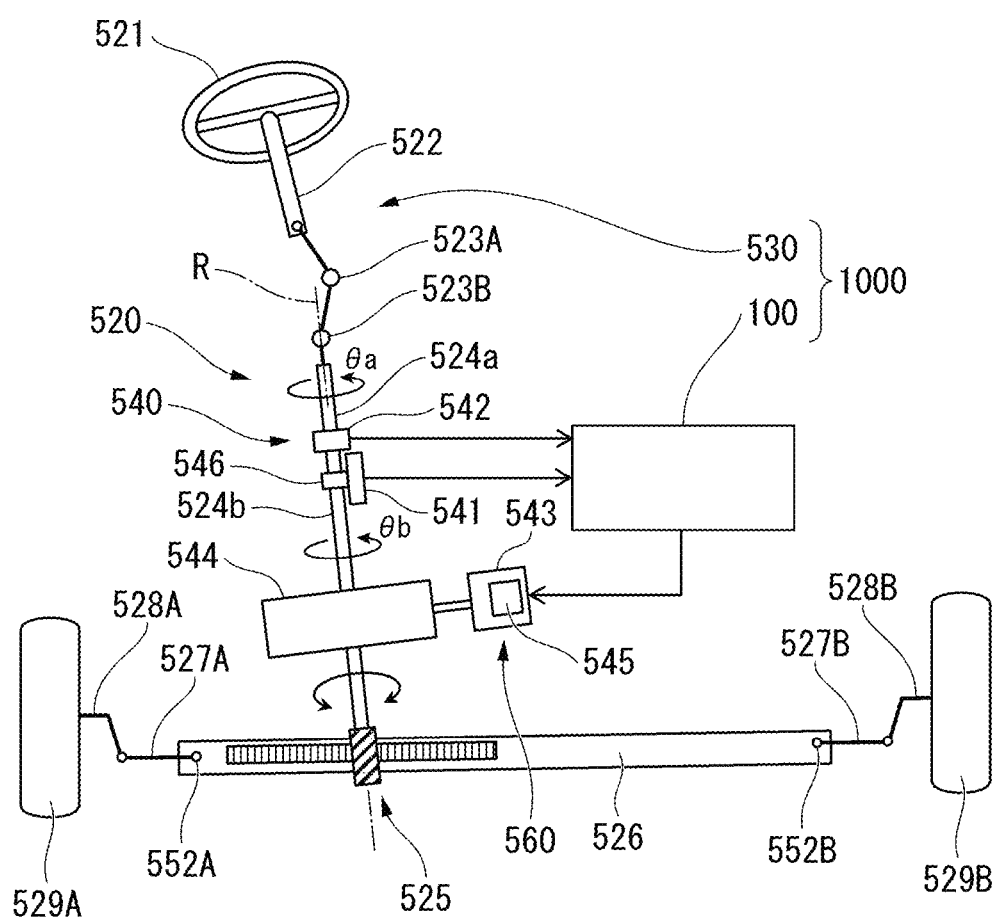
FIG. 1 is a diagram schematically illustrating an electric power steering device according to an example embodiment of the present disclosure.

An electric power steering device 1000 of the present example embodiment illustrated in FIG. 1 is mounted on a vehicle. As illustrated in FIG. 1, the electric power steering device 1000 includes a steering mechanism 530 and a control device 100. The steering mechanism 530 includes a steering mechanism unit 520 and an auxiliary mechanism unit 540. The electric power steering device 1000 controls the auxiliary mechanism unit 540 by the control device 100 to generate an auxiliary torque that assists the steering torque $T_h$ generated in the steering mechanism unit 520 when the driver who drives the vehicle steers the steering wheel 521. The auxiliary torque reduces the burden of the driver's operation when the driver operates the steering wheel 521. The driver of the vehicle is a steering person who steers the steering wheel 521 of the vehicle.

The steering mechanism unit 520 includes a steering wheel 521, a steering shaft 522, universal joints 523A and 523B, an input shaft 524a, an output shaft 524b, a rack and pinion mechanism 525, a rack shaft 526, right and left ball joints 552A and 552B, tie rods 527A and 527B, knuckles 528A and 528B, and right and left steering wheels 529A and 529B. That is, the steering mechanism 530 includes the steering wheel 521, the steering shaft 522, the universal joints 523A and 523B, the input shaft 524a, the output shaft 524b, the rack and pinion mechanism 525, the rack shaft 526, the right and left ball joints 552A and 552B, the tie rods 527A and 527B, the knuckles 528A and 528B, and the right and left steering wheels 529A and 529B.

The steering shaft 522 is a shaft extending from the steering wheel 521 steered by a steering person. One end portion of the input shaft 524a is connected to an end portion of the steering shaft 522 on a side opposite to a side connected to the steering wheel 521 via the universal joints 523A and 523B. As a result, the steering wheel 521 is connected to the input shaft 524a via the universal joints 523A and 523B and the steering shaft 522. The output shaft 524b is connected to the input shaft 524a via a torsion bar 546 described later. More specifically, one end portion of the output shaft 524b is connected to the other end portion of the input shaft 524a via the torsion bar 546. The other end portion of the output shaft 524b is connected to the rack shaft 526 via the rack and pinion mechanism 525.

The input shaft 524a and the output shaft 524b are coaxially disposed. The input shaft 524a and the output shaft 524b are rotatable about the same central axis. The input shaft 524a and the output shaft 524b are relatively rotatable with respect to each other in a range in which the torsion bar 546 described later can be twisted.

The auxiliary mechanism unit 540 includes a steering torque sensor 541, a steering angle sensor 542, a motor 543, a deceleration mechanism 544, an inverter 545, and a torsion bar 546. That is, the steering mechanism 530 includes the steering torque sensor 541, the steering angle sensor 542, the motor 543, the deceleration mechanism 544, the inverter 545, and the torsion bar 546. The torsion bar 546 connects the input shaft 524a and the output shaft 524b. The torsion bar 546 is disposed coaxially with the input shaft 524a and the output shaft 524b. In the following description, a virtual axis passing through a common central axis of the input shaft 524a, the output shaft 524b, and the torsion bar 546 is referred to as a rotation axis R. The torsion bar 546 can be twisted around the rotation axis R.

The steering torque sensor 541 detects a steering torque $T_h$ in the steering mechanism unit 520 by detecting the amount of torsion around the rotation axis R of the torsion bar 546. The steering torque $T_h$ is a torsion bar torque generated in the torsion bar 546, and is a torsional moment around the rotation axis R. The steering angle sensor 542 can detect a rotation angle θa around the rotation axis R of the input shaft 524a. The rotation angle Ga of the input shaft 524a is equal to the steering angle of the steering wheel 521. That is, the steering angle sensor 542 can detect the steering angle of the steering wheel 521 by detecting the rotation angle θa of the input shaft 524a. A rotation angle Gb of the output shaft 524b can be detected based on the steering torque sensor 541 and the steering angle sensor 542.

For example, the inverter 545 converts direct-current power into three-phase alternating-current power having U-phase, V-phase, and W-phase pseudo sine waves in accordance with the motor driving signal input from the control device 100 and supplies the power to the motor 543. The motor 543 is connected to the output shaft 524b via the deceleration mechanism 544. Three-phase AC power is supplied from the inverter 545 to the motor 543. The motor 543 is, for example, an interior permanent magnet synchronous motor (IPMSM), a surface permanent magnet synchronous motor (SPMSM), or a switched reluctance motor (SRM). When three-phase AC power is supplied from the inverter 545, the motor 543 generates an auxiliary torque according to the steering torque $T_h$. The motor 543 transmits the generated auxiliary torque to the output shaft 524b via the deceleration mechanism 544.

The control device 100 controls a control target 560 having at least the input shaft 524a, the output shaft 524b, and the motor 543 in the steering mechanism 530. In the present example embodiment, the control target 560 includes the steering wheel 521, the universal joints 523A and 523B, the input shaft 524a, the output shaft 524b, the torsion bar 546, the motor 543, and the deceleration mechanism 544. Since the control target 560 includes the input shaft 524a and the output shaft 524b that can rotate relative to each other via the torsion bar 546, the motion of the control target 560 cannot be described only by a simple equation of motion of the one-inertia system. The control target 560 changes between the one-inertia system and the two-inertia system depending on the strength with which the steering person grips the steering wheel 521. The stronger the steering person grips the steering wheel 521, the closer the control target 560 is to the one-inertia system. The weaker the steering person grips the steering wheel 521, the closer the control target 560 is to the two-inertia system.

The control device 100 is electrically connected to the inverter 545. The control device 100 generates a motor driving signal based on the detection signals detected by the steering torque sensor 541, the steering angle sensor 542, a vehicle speed sensor 300 mounted on a vehicle, and the like to output the motor driving signal to the inverter 545. The control device 100 controls the control target 560 by controlling the rotation of the motor 543 via the inverter 545. More specifically, the control device 100 controls the switching operation of the plurality of switching elements included in the inverter 545. Specifically, the control device 100 generates a control signal for controlling the switching operation of each switching element and outputs the control signal to the inverter 545. Each switching element is, for example, a MOSFET. In the following description, a control signal for controlling the switching operation of each switching element is referred to as a "gate control signal".

The control device 100 generates a torque command value based on the steering torque $T_h$ and the like, and controls the torque of the motor 543 and the rotation speed of the motor 543 by means of, for example, vector control. The vector control is a method in which current flowing through the motor 543 is separated into a current component that contributes to generation of a torque and a current component that contributes to generation of a magnetic flux, and the current components orthogonal to each other are independently controlled. The control device 100 can perform not only the vector control but also other closed-loop control. The rotation speed of the motor 543 is represented by, for example, a rotation speed [rpm] at which the rotor rotates in 1 minute, a rotation speed [rps] at which the rotor rotates in 1 second, or the like.

The value of the steering torque $T_h$ may be directly input to the control device 100 from the steering torque sensor 541, or the control device 100 may calculate the value of the steering torque $T_h$ from the output value of the steering torque sensor 541. The value of the steering angle of the steering wheel 521 may be directly input to the control device 100 from the steering angle sensor 542, or the control device 100 may calculate the value of the steering angle from the output value of the steering angle sensor 542.

The control device 100 and the motor 543 are modularized and manufactured and sold as a motor module. The motor module includes the motor 543 and the control device 100, and is suitably used for the electric power steering device 1000. The control device 100 can be manufactured and sold as a control device for controlling the electric power steering device 1000 independently of the motor 543.

Figure 2:
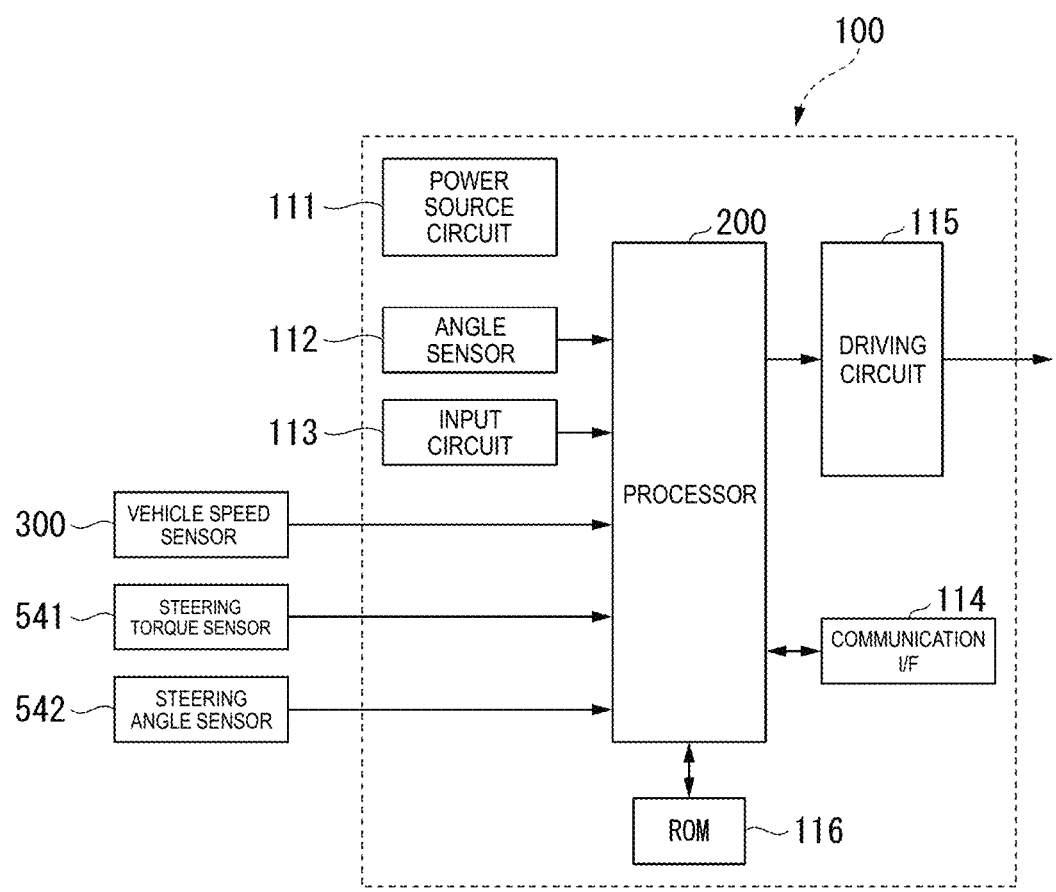
FIG. 2 is a block diagram illustrating a configuration of a control device according to an example embodiment of the present disclosure.

FIG. 2 illustrates a typical example of the configuration of the control device 100 according to the present example embodiment. The control device 100 includes a power source circuit 111, an angle sensor 112, an input circuit 113, a communication I/F 114, a driving circuit 115, a ROM 116, and a processor 200, for example. The control device 100 can be realized as a printed circuit board (PCB) on which these electronic components are implemented.

In the processor 200, the vehicle speed sensor 300, the steering torque sensor 541, and the steering angle sensor 542 mounted on the vehicle are communicably connected to the processor 200. A vehicle speed is transmitted from the vehicle speed sensor 300 to the processor 200. The steering torque $T_h$ is transmitted from the steering torque sensor 541 to the processor 200. The steering angle is transmitted from the steering angle sensor 542 to the processor 200.

The processor 200 is a semiconductor integrated circuit and is also referred to as a central processing unit (CPU) or a microprocessor. The processor 200 sequentially executes computer programs which are stored in the ROM 116 and describe commands for controlling motor driving, and realizes desired processing. In addition to the processor 200 or instead of the processor 200, the control device 100 may include a field programmable gate array (FPGA) equipped with a CPU, a graphics processing unit (GPU), an application specific integrated circuit (ASIC), an application specific standard product (ASSP), or a combination of two or more circuits selected from these circuits. The processor 200 sets a current command value according to the actual current value, the rotation angle of the rotor, and the like of the motor 543, generates a pulse width modulation (PWM) signal, and outputs the PWM signal to the driving circuit 115.

The power source circuit 111 is connected to an external power source (not illustrated). The power source circuit 111 generates a DC voltage necessary for each unit of the control device 100. The DC voltage generated in the power source circuit 111 is, for example, 3 V or 5 V.

The angle sensor 112 detects a rotation angle of the rotor in the motor 543, and outputs the rotation angle to the processor 200. The angle sensor 112 may be a resolver, a Hall element such as a Hall IC, or an MR sensor having a magnetoresistive element. The processor 200 can calculate an angular velocity ω[rad/s] of the motor 543 based on an electrical angle θm of the motor 543 obtained based on the angle sensor 112. The control device 100 may include, instead of the angle sensor 112, a speed sensor capable of detecting the rotational angular velocity of the motor 543 and an acceleration sensor capable of detecting the rotational angular acceleration of the motor 543.

A motor current value detected by a current sensor (not illustrated) is input to the input circuit 113. In the following description, a motor current value detected by a current sensor (not illustrated) is referred to as an "actual current value". The input circuit 113 converts the level of the input actual current value into an input level of the processor 200 as necessary, and outputs the actual current value to the processor 200. A typical example of the input circuit 113 is an analog-digital conversion circuit.

The communication I/F 114 is an input/output interface configured to transmit and receive data in conformity with an in-vehicle control area network (CAN), for example.

The driving circuit 115 is typically a gate driver or a pre-driver. The driving circuit 115 generates a gate control signal in accordance with the PWM signal and gives the gate control signal to gates of the plurality of switching elements included in the inverter 545. For example, when the motor 543 to be driven is a motor that can be driven at a low voltage, the driving circuit 115 as a gate driver is not necessarily required in some cases. In that case, the function of the gate driver in the driving circuit 115 may be implemented in the processor 200.

The ROM 116 is electrically connected to the processor 200. The ROM 116 is a writable memory, a rewritable memory, or a read-only memory, for example. Examples of the writable memory include a programmable read only memory (PROM). Examples of the rewritable memory include a flash memory and an electrically erasable programmable read only memory (EEPROM). The ROM 116 stores a control program including commands for causing the processor 200 to control motor driving. For example, the control program stored in the ROM 116 is once developed in a RAM (not illustrated) at the time of booting.

Figure 3:
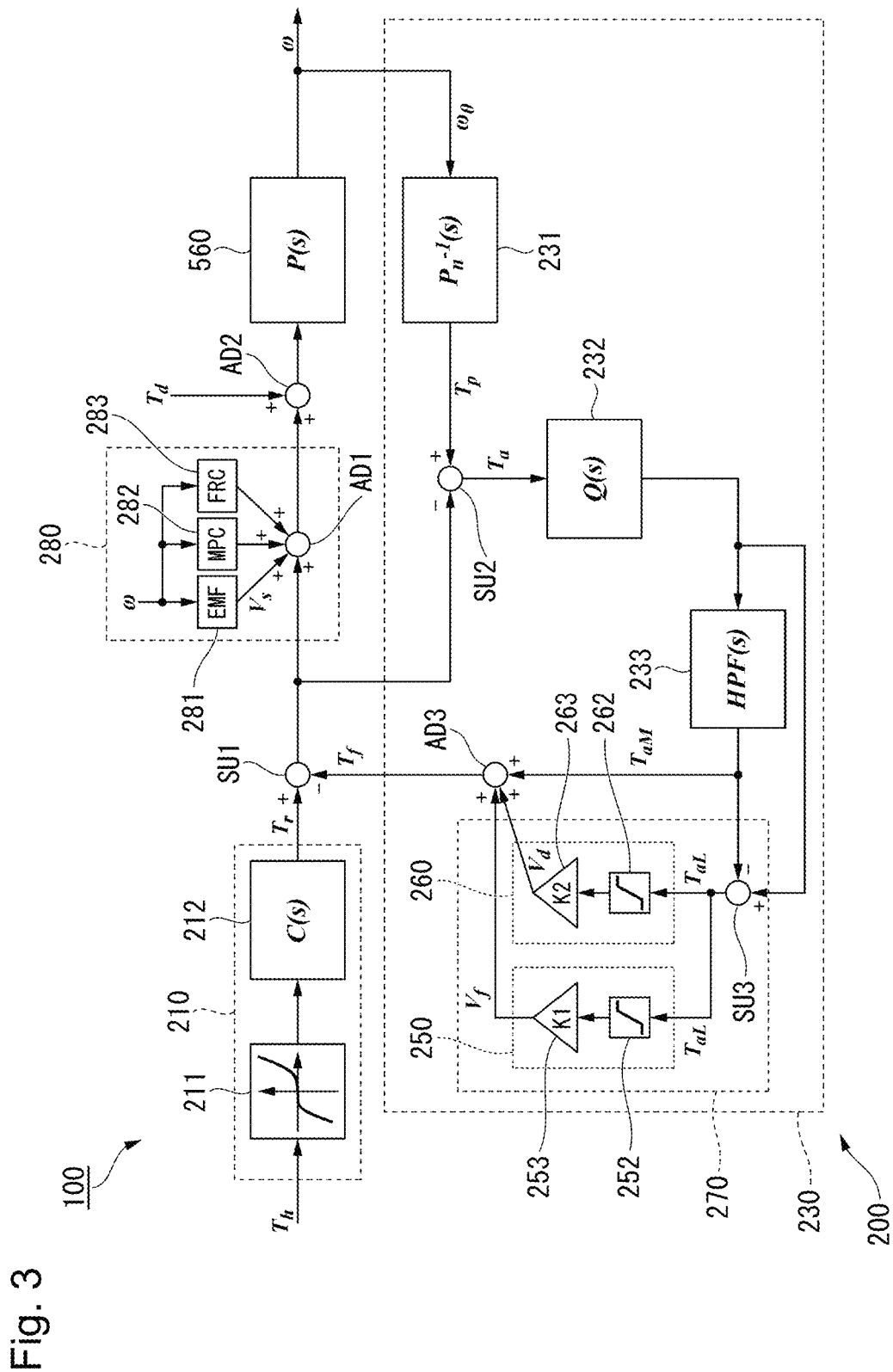
FIG. 3 is a functional block diagram illustrating functions of a processor in the control device according to an example embodiment of the present disclosure.

FIG. 3 illustrates an example of functional blocks of the processor 200 according to the present example embodiment. The processor 200, which is a computer, sequentially executes processing or tasks necessary for controlling the motor 543 using each functional block. Each functional block of the processor 200 illustrated in FIG. 3 may be implemented in the processor 200 as software such as firmware, may be implemented in the processor 200 as hardware, or may be implemented in the processor 200 as software and hardware. The processing of each functional block in the processor 200 is typically described in a computer program in units of software modules and stored in the ROM 116. However, in the case where an FPGA or the like is used, all or some of the functional blocks may be implemented as hardware accelerators. The control method of the control device 100 according to the present example embodiment is implemented in a computer, and can be implemented by causing the computer to execute a desired operation.

The processor 200 includes a reaction force controller 210, an assist controller 230, a state feedback circuit 280, a subtractor SU1, an adder AD1, and an adder AD2. That is, the control device 100 is provided with the reaction force controller 210, the assist controller 230, the state feedback circuit 280, the subtractor SU1, the adder AD1, and the adder AD2. In other words, functions corresponding to the reaction force controller 210, the assist controller 230, the state feedback circuit 280, the subtractor SU1, the adder AD1, and the adder AD2 are implemented in the processor 200 of the control device 100.

The steering torque $T_h$ detected by the steering torque sensor 541 is input to the reaction force controller 210. The reaction force controller 210 generates the input torque $T_r$ input to the control target 560 based on the steering torque $T_h$, that is, the torsion bar torque generated in the torsion bar 546. The input torque $T_r$ is a target torque of the motor 543 and is a torque command value. The reaction force controller 210 generates the input torque $T_r$ and controls the torque of the motor 543 to control the reaction force transmitted from the steering wheel 521 to the steering person. The reaction force controller 210 generates the input torque $T_r$ by applying phase compensation to the steering torque $T_h$ when the steering frequency or the steering speed is within a predetermined range. The steering frequency is a frequency of the steering angle that changes based on the operation of the steering wheel 521 by the driver. The steering speed is a speed of the steering angle that changes based on the operation of the steering wheel 521 by the driver. The reaction force controller 210 illustrated in FIG. 3 includes a base assist calculation unit 211 and a phase compensator 212.

The base assist calculation unit 211 acquires the steering torque $T_h$ and the vehicle speed. The base assist calculation unit 211 generates a base assist torque based on the steering torque $T_h$ and the vehicle speed. For example, the base assist calculation unit 211 includes a look-up table (LUT) in which a relationship among the steering torque $T_h$, the vehicle speed, and the base assist torque is defined. The base assist calculation unit 211 can determine the base assist torque having a correspondence relationship based on the steering torque $T_h$ and the vehicle speed with reference to the look-up table. The base assist calculation unit 211 can determine a base assist gain based on a slope defined by a ratio of a change amount of the base assist torque to a fluctuation amount of the steering torque $T_h$.

The phase compensator 212 in the present example embodiment adjusts the assist gain within a range of the steering frequency when the driver operates the steering wheel 521, and compensates for the rigidity of the torsion bar 546. The range that the steering frequency can take is, for example, 5 Hz or less. The phase compensator 212 may apply, for example, first-order phase compensation to the steering torque $T_h$, that is, the torsion bar torque when the steering frequency is 5 Hz or less. The first-order phase compensation is expressed by, for example, a transfer function of Expression (1).

[Math. 1]

$$C(s) = \frac{\frac{1}{2\pi f_1}s + 1}{\frac{1}{2\pi f_2}s + 1} \quad (1)$$

In Expression (1), s is a Laplace transformer, $f_1$ is a frequency (Hz) for determining the zero point of the transfer function, and $f_2$ is a frequency (Hz) for determining the pole of the transfer function. A graph in which the gain (or loop gain) is set as a vertical axis and the logarithm of the frequency is set as a horizontal axis is referred to as a gain diagram. In the gain diagram, the zero point means the intersection of the gain curve and the horizontal axis indicating 0 dB, and the pole means the maximum point of the gain curve. For example, by setting the pole frequency to be higher than the zero point frequency, a phase lead compensation can be applied. The larger the interval between the frequency of the pole and the frequency of the zero point, the larger the phase advance amount.

The phase compensator 212 generates the input torque $T_r$ based on the base assist torque and the base assist gain output from the base assist calculation unit 211. For example, the phase compensator 212 may be a stabilization compensator and apply stability phase compensation to the base assist torque. The phase compensator 212 may have a second-order or higher transfer function whose frequency characteristic is variable according to the base assist gain. The second-order or higher transfer function is expressed using a responsiveness parameter and a damping parameter. The second-order or higher transfer function can be expressed by, for example, Expression (2). By setting the order number of the transfer function to two, damping can be given to the characteristic of the transfer function. A phase characteristic can be adjusted by changing the damping.

[Math. 2]

$$C(s) = \frac{s^2 + 2\zeta_1 \omega_1 s + \omega_1^2}{s^2 + 2\zeta_2 \omega_2 s + \omega_2^2}\left(\frac{\omega_2^2}{\omega_1^2}\right) \quad (2)$$

In Expression (2), s is a Laplace transformer, $\omega_1$ is a frequency of a zero point of the transfer function, $\omega_2$ is a frequency of a pole of the transfer function, $\zeta_1$ is a damping ratio of the zero point, and $\zeta_2$ is a damping ratio of the pole. The pole frequency $\omega_2$ is lower than the zero point frequency $\omega_1$.

The assist controller 230 generates a correction torque $T_f$ for correcting the input torque $T_r$ based on the output of the control target 560 and the nominal model. In the present example embodiment, the correction torque $T_f$ is feedback torque fed back to the input torque $T_r$. The nominal model is an internal model used as a model that restrains the control target 560 when controlling the control target 560. The nominal model will be described in detail later. In the present example embodiment, the assist controller 230 is a model following controller configured to perform model following control. A specific configuration of the assist controller 230 will be described in detail later.

The subtractor SU1 subtracts the correction torque $T_f$ output from the assist controller 230 from the input torque $T_r$. The output from the subtractor SU1 is input to the adder AD1 and the assist controller 230. The adder AD1 outputs a value obtained by adding the output from the state feedback circuit 280 to the output from the subtractor SU1 to the adder AD2. The adder AD2 outputs a value obtained by adding a disturbance torque $T_d$ to the output from the adder AD1 to the control target 560.

The disturbance torque $T_d$ is a difference between the actual output torque of the motor 543 and the ideal output torque of the motor 543. The disturbance torque $T_d$ includes disturbance torque externally applied to the control target 560. The disturbance torque $T_d$ includes, for example, an extra torque generated by friction and rattling due to mechanical elements such as the motor 543 and the deceleration mechanism 544, a torque ripple generated in the motor 543, self-aligning torque, and disturbance torque that may be generated when traveling on an unpaved rattling road, a gravel road, or the like. Here, the self-aligning torque means torque that acts in a direction in which the steering wheel 521 returns by the elasticity of the tire that is twisted when the steering wheel 521 is turned.

In the present example embodiment, the assist controller 230 generates the correction torque $T_f$ based on an angular velocity we calculated from the rotation angle θa of the input shaft 524a, and feeds back the correction torque $T_f$ to the input torque $T_r$. The angular velocity we is a value corresponding to the angular velocity of the motor 543 theoretically calculated from the rotation angle θa of the input shaft 524a. For example, immediately after the steering person starts to rotate the steering wheel 521, the input shaft 524a may rotate with the rotation of the steering wheel 521, but the motor 543 may not yet start to be driven and the output shaft 524b may not rotate. In this case, the actual angular velocity ω of the motor 543 is 0, but theoretically, when the input shaft 524a rotates, the motor 543 also rotates and the output shaft 524b also rotates. The angular velocity We is a value corresponding to the angular velocity of the motor 543 in a case where the motor 543 is theoretically rotated as described above. Therefore, the angular velocity $\omega_\theta$ may be different from the actual angular velocity ω of the motor 543. The rotation angle θa used for calculating the angular velocity $\omega_\theta$ may be a value detected by the steering angle sensor 542 or a value calculated from the rotation angle θb of the output shaft 524b.

The assist controller 230 includes an inverse nominal model 231, a low-pass filter 232, a high-pass filter 233, an assist adjusting unit 270, a subtractor SU2, and an adder AD3. The high-pass filter 233 has a first cutoff frequency Cf1. The first cutoff frequency Cf1 ranges, for example, from 2 Hz to 10 Hz inclusive, preferably from 5 Hz to 7 Hz inclusive.

The low-pass filter 232 has a second cutoff frequency Cf2 higher than the first cutoff frequency Cf1. The second cutoff frequency Cf2 is, for example, from 3 Hz to 50 Hz inclusive. However, the upper limit of the second cutoff frequency Cf2 can be set in a range of about 140 Hz or more and 200 Hz or less. The order of the low-pass filter 232 is 3 or more. The low-pass filter 232 may include, for example, a plurality of low-pass filters. The low-pass filter 232 and the high-pass filter 233 are coupled in series.

Figure 4:
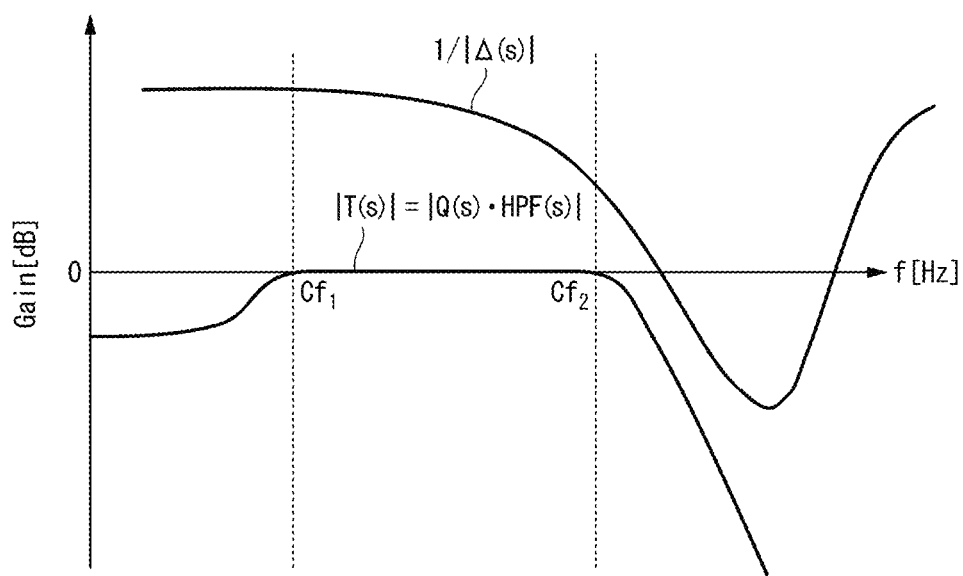
FIG. 4 is a graph illustrating a gain characteristic of a complementary sensitivity function and a gain characteristic of a reciprocal of a modeling error between a transfer function of a control target and a transfer function of a nominal model.

When a transfer function of the low-pass filter 232 is Q(s) and a transfer function of the high-pass filter 233 is HPF(s), the assist controller 230 is configured such that the transfer function P(s) of the control target 560 is constrained to a transfer function $P_n(s)$ of a predetermined nominal model in a frequency band where a gain in a gain characteristic of Q(s)·HPF(s) is 1. Q(s)·HPF(s) is a complementary sensitivity function T(s) of the inner loop configured by the assist controller 230. As illustrated in FIG. 4, Q(s)·HPF(s), that is, the complementary sensitivity function T(s), has a gain of 0 dB, that is, a gain of 1 in the transfer function in a frequency band where the frequency f is the first cutoff frequency Cf1 or more and the second cutoff frequency Cf2 or less. In FIG. 4, the absolute value of the complementary sensitivity function T(s) is illustrated. In the present specification, "the transfer function of the control target is constrained to the transfer function of the nominal model" means that, for example, the control target is controlled such that the transfer function of the control target appears to be a transfer function of the nominal model in appearance when the input/output relationship is viewed.

The inverse nominal model 231 is an inverse model of a predetermined nominal model (plant model) used to constrain the control target 560. In the present example embodiment, the transfer function $P_n(s)$ of the predetermined nominal model is expressed by the following Expression (3). The transfer function $P_n^{-1}(s)$ of an inverse nominal model 231 is expressed by the following Expression (4).

[Math. 3]
$$P_n(s) = \frac{1}{J_{STG_n}s + B_{STG_1}} \frac{s^2 + 2\xi_{1n}\omega_{1n}s + \omega_{1n}^2}{s^2 + 2\zeta_{2n}\omega_{2n}s + \omega_{2n}^2} \quad (3)$$

[Math. 4]
$$P_n^{-1}(s) = (J_{STG_n}s + B_{STG_n})\left(\frac{s^2 + 2\zeta_{2n}\omega_{2n}s + \omega_{2n}^2}{s^2 + 2\zeta_{1n}\omega_{1n}s + \omega_{1n}^2}\right) \quad (4)$$

In Expressions (3) and (4), s is a Laplace transformer, $J_{STG_n}$ is a parameter representing inertia moment of the nominal model, $B_{STG_n}$ is a parameter representing a viscous friction coefficient of the nominal model, $\omega_{1n}$ is a frequency at a zero point of the transfer function $P_n(s)$, $\omega_{2n}$ is a frequency of a pole of the transfer function $P_n(s)$, ($\zeta_{1n}$ is a damping ratio at the zero point of the transfer function $P_n(s)$, and $\zeta_{2n}$ is a damping ratio at the pole of the transfer function $P_n(s)$.

In the present example embodiment, the nominal model is a model having frequency characteristics between a one-inertia system and a two-inertia system. Expression (3) representing the transfer function $P_n(s)$ of the nominal model is an expression obtained by adding an attenuation term to an expression representing a two-inertia system. In the above Expression (3), the attenuation terms are $2\zeta_{1n}\omega_{1n}s$ and $2\zeta_{2n}\omega_{2n}s$. An equation obtained by removing these attenuation terms from Expression (3) is an equation representing a two-inertia system. In the present example embodiment, the degree of the transfer function $P_n(s)$ of the nominal model is 3.

In the present example embodiment, the nominal model is a model in which mechanical characteristics when the steering person steers the steering wheel 521 are considered. As described above, the control target 560 approaches the one-inertia system as the steering person grips the steering wheel 521 firmly, and approaches the two-inertia system as the steering person grips the steering wheel 521 weakly. Therefore, the transfer function P(s) of the control target 560 changes between the one-inertia system and the two-inertia system depending on how a force is applied from the arm of the steering person to the steering wheel 521. In the present example embodiment, by setting the nominal model as a model having frequency characteristics between a one-inertia system and a two-inertia system, the modeling error $\Delta(s)$ between the transfer function $P_n(s)$ of the nominal model and the transfer function P(s) of the control target 560 can be prevented from becoming too large regardless of whether the state of the control target 560 is a one-inertia system or a two-inertia system. Therefore, the control target 560 can be suitably controlled using the nominal model regardless of how the steering person steers the steering wheel 521. As described above, in the present example embodiment, the nominal model is a model in consideration of mechanical characteristics given to the control target 560 by the way the steering person grips the steering wheel 521. The control device 100 can suitably control the control target 560 by having such a nominal model as an internal model.

In the present specification, "The nominal model is a model in consideration of mechanical characteristics when the steering person steers the steering wheel." means that, for example, the nominal model may be a model that can compensate for at least a part of the influence given to the control target by the mechanical characteristic when the steering person steers the steering wheel. The nominal model may be, for example, a model directly incorporating mechanical characteristics of the arm movement of the steering person.

As illustrated in FIG. 3, the output of the control target 560 is input to the inverse nominal model 231. Specifically, the angular velocity we calculated from the rotation angle $\theta a$ of the input shaft 524a is input to the inverse nominal model 231. The inverse nominal model 231 outputs a torque $T_p$ based on the above Expression (4) and the input angular velocity $\omega_\theta$. That is, the assist controller 230 calculates the torque $T_p$ using the nominal model based on the output of the control target 560. The torque $T_p$ is equal to the value of the torque input to the nominal model when the output value of the nominal model is the same value as the output value of the control target 560.

The subtractor SU2 subtracts the output of the subtractor SU1 from the output of the inverse nominal model 231 to generate a differential torque $T_a$. That is, the subtractor SU2 generates the differential torque $T_a$ by subtracting, from the torque $T_p$, the input torque $T_r$ before a state compensation value $V_s$ described later is fed back after the correction torque $T_f$ is fed back. The differential torque $T_a$ is, for example, an estimated value of the disturbance torque $T_d$. The differential torque $T_a$ output from the subtractor SU2 is subjected to filtering processing by the low-pass filter 232 and the high-pass filter 233 coupled in series in this order, and is input to the adder AD3. The differential torque $T_a$ filtered by the low-pass filter 232 and the high-pass filter 233 is in a state in which a frequency component lower than the first cutoff frequency Cf1 and a frequency component higher than the second cutoff frequency Cf2 are removed. That is, the differential torque $T_a$ filtered by the low-pass filter 232 and the high-pass filter 233 is a frequency component $T_{aM}$ equal to or higher than the first cutoff frequency Cf1 and equal to or lower than the second cutoff frequency Cf2.

The assist adjusting unit 270 generates a compensation value for friction and disturbance and adjusts the differential torque $T_a$. In the present example embodiment, the assist adjusting unit 270 adjusts the frequency component $T_{aM}$ of the differential torque $T_a$. The assist adjusting unit 270 is coupled in parallel to the high-pass filter 233. The assist adjusting unit 270 includes a friction compensation value calculator 250, a disturbance compensation value calculator 260, and a subtractor SU3.

The subtractor SU3 subtracts the output value from the high-pass filter 233 from the output value from the low-pass filter 232. Here, the output value from the low-pass filter 232 is a value obtained by removing a frequency component higher than the second cutoff frequency Cf2 from the differential torque $T_a$. The output value from the high-pass filter 233 is a value obtained by removing a frequency component higher than the second cutoff frequency Cf2 and a frequency component lower than the first cutoff frequency Cf1 from the differential torque $T_a$. Therefore, the value output from the subtractor SU3 is the frequency component $T_{aL}$ lower than the first cutoff frequency Cf1 in the differential torque $T_a$. The output of the subtractor SU3 is input to the friction compensation value calculator 250 and the disturbance compensation value calculator 260. The frequency component $T_{aL}$ includes a frictional force, a self-aligning torque, a disturbance torque caused by backlash of the control target 560, a torque ripple generated in the control target 560, and the like.

The friction compensation value calculator 250 calculates the friction compensation value $V_f$ that compensates at least a part of the frictional force generated in control target 560 based on differential torque $T_a$. As described above, the value from the subtractor SU3 input to the friction compensation value calculator 250 is the frequency component $T_{aL}$ lower than the first cutoff frequency Cf1 in the differential torque $T_a$. Therefore, in the present example embodiment, the friction compensation value calculator 250 calculates the friction compensation value $V_f$ based on a component having a frequency lower than the first cutoff frequency Cf1 in the differential torque $T_a$.

The friction compensation value calculator 250 includes a limiter 252 and a gain adjuster 253. The limiter 252 limits the output value from the subtractor SU3. The limiter 252 clips the input value to the upper or lower threshold when the input value exceeds the upper or lower threshold. The gain adjuster 253 applies a gain K1 to the output value from the limiter 252. The friction compensation value calculator 250 calculates the friction compensation value $V_f$ by applying the limit by the limiter 252 and the gain K1 to the component of the frequency lower than the first cutoff frequency Cf1 in the differential torque $T_a$. The threshold of the limiter 252 and the value of the gain K1 are determined in advance based on, for example, the frictional force actually generated in the control target 560.

In order to apply friction compensation to the correction torque $T_f$ used for the model following control in the assist controller 230, it is necessary to pay attention to the stability condition of the model following control. This condition is that the gain in the gain characteristic of the transfer function of the friction compensation value calculator 250 constrained to the characteristic considering stability does not exceed 1 according to the small gain theorem described later. This is derived from the design condition of the low-pass filter 232. In the present example embodiment, the subtractor SU3 is provided in the preceding stage of the limiter 252 so that the value of the gain K1 in the gain adjuster 253 is set to 1 at the maximum and the gain in the gain characteristic becomes 1 under this condition, and the subtraction processing is applied. In other words, the friction compensation value calculator 250 behaves as a low-pass filter having a transfer function of 1−HPF(s).

The friction compensation value $V_f$ output from the friction compensation value calculator 250 is a value that compensates for at least a part of the frictional force component included in the frequency component $T_{aL}$ of the differential torque $T_a$. In general, since appropriate friction is required for the control target 560, the friction compensation value calculator 250 calculates a value smaller than the frictional force actually generated in the control target 560 as the friction compensation value $V_f$. This makes it possible to achieve highly accurate friction compensation while maintaining an appropriate frictional force on the control target 560. The object of friction compensation using the friction compensation value $V_f$ is, for example, the friction of the motor 543, the friction of the deceleration mechanism 544, the right/left difference in friction of the deceleration mechanism 544, and the like.

Here, the frequency component $T_{aL}$ of the differential torque $T_a$ includes, in addition to the frictional force component, the self-aligning torque generated in the control target 560, the disturbance torque caused by the backlash generated in the control target 560, and the torque ripple generated in the control target 560. Therefore, the friction compensation value $V_f$ obtained by processing the frequency component $T_{aL}$ by the limiter 252 and the gain adjuster 253 also includes a compensation value for compensating at least a part of the self-aligning torque generated in the control target 560, the disturbance torque caused by the backlash generated in the control target 560, and the torque ripple generated in the control target 560.

The vehicle equipped with the electric power steering device 1000 can travel according to a travel mode having an automatic driving mode and a manual driving mode. In this case, the gain K1 of the gain adjuster 253 may be switched according to the travel mode. The greater the gain K1 of the gain adjuster 253, the greater the degree of friction reduction. The gain K1 in the automatic driving mode is preferably larger than the gain K1 set in the manual driving mode. As a result, it is possible to apply optimum friction compensation to an automatic driving mode in which a reduction in friction is more required.

The disturbance compensation value calculator 260 calculates a disturbance compensation value $V_d$ for compensating at least a part of the self-aligning torque generated in the control target 560. In the present example embodiment, the disturbance compensation value $V_d$ includes a compensation value for compensating at least a part of the frictional force generated in the control target 560, the disturbance torque caused by the backlash generated in the control target 560, and the torque ripple generated in the control target 560. The disturbance compensation value calculator 260 calculates a disturbance compensation value $V_d$ based on a differential torque $T_a$ that is a difference between the torque $T_p$ output from the inverse nominal model 231 and the input torque $T_r$. That is, the disturbance compensation value calculator 260 calculates the disturbance compensation value $V_d$ based on the differential torque $T_a$ that is the difference between the torque $T_p$ calculated using the nominal model based on the output of the control target 560 and the input torque $T_r$. As described above, the value from the subtractor SU3 input to the disturbance compensation value calculator 260 is a frequency component lower than the first cutoff frequency Cf1 in the differential torque $T_a$. Therefore, in the present example embodiment, the disturbance compensation value calculator 260 calculates the disturbance compensation value $V_d$ based on a component having a frequency lower than the first cutoff frequency Cf1 in the differential torque $T_a$.

The disturbance compensation value calculator 260 includes a limiter 262 and a gain adjuster 263. The limiter 262 limits the output value from the subtractor SU3. The limiter 262 clips the input value to the upper or lower threshold when the input value exceeds the upper or lower threshold. The threshold of the limiter 262 is different from the threshold of the limiter 252, for example. The gain adjuster 263 applies a gain K2 to the output value from the limiter 262. The maximum value of the gain K2 of the gain adjuster 263 is determined under the condition that the transfer function P(s) of the control target 560 is constrained by the transfer function $P_n(s)$ of the nominal model. The value of the gain K2 is different from the value of the gain K1, for example. The value of the gain K2 is, for example, about 0.3 or more and 0.8 or less. The gain K2 of the gain adjuster 263 may be switched according to the traveling mode of the vehicle.

The disturbance compensation value $V_d$ is a value that compensates for at least a part of the self-aligning torque component included in the frequency component $T_{aL}$ of the differential torque $T_a$. For example, the disturbance compensation value calculator 260 calculates a value corresponding to about half of the self-aligning torque actually generated in the control target 560 as the disturbance compensation value $V_d$. The self-aligning torque actually generated in the control target 560 is experimentally obtained in advance for each frequency, for example. The threshold of the limiter 262 of the disturbance compensation value calculator 260 and the value of the gain K2 are adjusted to values at which the disturbance compensation value $V_d$ is calculated as a value about half the magnitude of the self-aligning torque obtained in advance. The disturbance compensation value $V_d$ calculated by the disturbance compensation value calculator 260 is a value different from the friction compensation value $V_f$ calculated by the friction compensation value calculator 250.

Here, the frequency component $T_{aL}$ of the differential torque $T_a$ includes, in addition to the self-aligning torque, a frictional force generated in the control target 560, a disturbance torque caused by backlash generated in the control target 560, and a torque ripple generated in the control target 560. Therefore, the disturbance compensation value $V_d$ obtained by processing the frequency component $T_{aL}$ by the limiter 262 and the gain adjuster 263 also includes a compensation value for compensating at least a part of the frictional force generated in the control target 560, the disturbance torque caused by the backlash generated in the control target 560, and the torque ripple generated in the control target 560.

The adder AD3 adds the output value from the assist adjusting unit 270 to the output value from the high-pass filter 233. That is, the adder AD3 adds the friction compensation value $V_f$ and the disturbance compensation value $V_d$ to the frequency component $T_{aM}$. The adder AD3 outputs the correction torque $T_f$ calculated by adding the frequency component $T_{aM}$, the friction compensation value $V_f$, and the disturbance compensation value $V_d$. The correction torque $T_f$ output from the adder AD3 is fed back to the input of the control target 560, that is, the input torque $T_r$. As described above, in the present example embodiment, the assist controller 230 generates the correction torque $T_f$ by adding the friction compensation value $V_f$ and the disturbance compensation value $V_d$ to the differential torque $T_a$ from which the frequency component lower than the first cutoff frequency Cf1 has been removed by the high-pass filter 233, that is, the frequency component $T_{aM}$.

The state feedback circuit 280 feeds back the state compensation value $V_s$ to the input torque $T_r$ based on the output of the control target 560 so that the apparent transfer function of the control target 560 approaches the transfer function $P_n(s)$ of the nominal model. The apparent transfer function of the control target 560 is, for example, a transfer function of one portion in a case where a portion located inside the feedback loop created by the assist controller 230 is regarded as the one portion. Specifically, in the present example embodiment, the apparent transfer function of the control target 560 is a transfer function of the entire portion from the subtractor SU1 to the output of the control target 560, and is a transfer function of a portion combining the state feedback circuit 280 and the control target 560. In the present example embodiment, the state feedback circuit 280 feeds back the state compensation value $V_s$ to the input torque $T_r$ after the state compensation value is corrected by the correction torque $T_f$ and before the state compensation value is input to the control target 560.

The state compensation value $V_s$ includes a compensation value that compensates at least a part of the inertial force generated in the control target 560, the viscous force generated in the control target 560, and the frictional force generated in the control target 560. More specifically, the state compensation value $V_s$ includes a compensation value that compensates at least a part of the inertial force generated in the motor 543, the viscous force generated in the motor 543, and the frictional force generated in the motor 543. In the present example embodiment, the state compensation value $V_s$ is a compensation value including the inertial force generated in the motor 543, the viscous force generated in the motor 543, and the frictional force generated in the motor 543.

The state feedback circuit 280 includes an inertia compensator 281, a viscosity compensator 282, and a friction compensator 283. The inertia compensator 281 calculates a compensation value for compensating at least a part of the inertial force generated in the motor 543 based on the angular velocity ω of the motor 543. The viscosity compensator 282 calculates a compensation value for compensating at least a part of the viscous force generated in the motor 543 based on the angular velocity ω of the motor 543. The friction compensator 283 calculates a compensation value for compensating at least a part of the frictional force generated in the motor 543 based on the angular velocity ω of the motor 543. In the present example embodiment, the state compensation value $V_s$ includes a compensation value calculated by the inertia compensator 281, a compensation value calculated by the viscosity compensator 282, and a compensation value calculated by the friction compensator 283. The compensation value calculated by the inertia compensator 281, the compensation value calculated by the viscosity compensator 282, and the compensation value calculated by the friction compensator 283 are output to the adder AD1 and added to the input torque $T_r$ corrected by the correction torque $T_f$.

Next, the control by the assist controller 230 will be described in more detail. The assist controller 230 controls the control target 560 using the inverse model of the nominal model as the internal model, that is, the inverse nominal model 231. In the present example embodiment, the torque ripple or the like depending on the angular velocity ω of the motor 543 can be compensated by the feedback loop formed by the assist controller 230. The signal of the angular velocity ω used for the control can be corrected for each type of the motor 543, and the accuracy of the signal of the angular velocity ω can be improved as compared with the current signal and the like. As a result, torque ripple compensation with high accuracy can be applied to torque control.

The assist controller 230 is structurally similar to a conventional disturbance estimator (disturbance observer), but is different from the conventional disturbance estimator in operation and effect. A conventional disturbance estimator estimates a disturbance torque by using an inverse plant model as an internal model as a model close to the control target 560, and reduces the influence of disturbance by adjusting the disturbance torque in advance.

The control by the assist controller 230 according to the present example embodiment utilizes the effect that the transfer function P(s) of the control target 560 is constrained by the transfer function $P_n$(s) of the nominal model as the internal model by the feedback loop. For example, if the nominal model is defined such that there is no torque ripple, the transfer function P(s) of the control target 560 is constrained to the characteristic without the torque ripple by the model following control, and as a result, the torque ripple can be reduced by applying torque ripple compensation. By setting the nominal model as a low-inertia model and constraining the control target 560 with the nominal model, the control target 560 can be treated as a low-inertia model. The control target 560 can be treated as a low viscosity model by setting the nominal model as a low viscosity model and constraining the control target 560 with the nominal model. In addition to compensation of the torque ripple of the motor 543, for example, lost torque compensation or motor inertia compensation is performed by executing the model following control by the assist controller 230. In the above-described Expressions (3) and (4), by appropriately setting $J_{STGn}$ and $B_{STGn}$, a desired frequency characteristic can be given to the transfer function P(s) of the control target 560.

When a modeling error between the transfer function P(s) of the control target 560 and the transfer function $P_n$(s) of the nominal model is Δ(s), the transfer function P(s) of the control target 560 is expressed by the following Expression (5).

[Math. 5]

$$P(s) = \frac{1}{J_{STG_n}s + B_{STG_n}} \frac{s^2 + 2\zeta_{1n}\omega_{1n}s + \omega_{1n}^2}{s^2 + 2\zeta_{2n}\omega_{2n}s + \omega_{2n}^2}(1 + \Delta(s)) \quad (5)$$

The gain characteristic of the transfer function P(s) of the control target 560 has peaks in two frequency values, for example. The modeling error Δ(s) appears, for example, near the higher frequency peak of the two peaks in the gain characteristic of the control target 560. Therefore, as illustrated in FIG. 4, the reciprocal 1/Δ(s) of the modeling error Δ(s) has a bottom in a relatively high frequency region. In FIG. 4, the modeling error Δ(s) is indicated by an absolute value. When the modeling error Δ(s) increases, the deviation between the transfer function P(s) of the control target 560 and the transfer function $P_n$(s) of the nominal model increases, and the control of the control target 560 using the nominal model by the assist controller 230 becomes unstable. Therefore, in the region where the modeling error Δ(s) is relatively small, the control target 560 can be stably and suitably controlled by constraining the control target 560 to the nominal model with the gain of the complementary sensitivity function T(s), that is, Q(s)·HPF(s) set to 1. The frequency characteristic of the modeling error Δ(s) can be adjusted by adjusting $J_{STGn}$ and $B_{STGn}$ in the transfer function $P_n$ (s) of the nominal model. The frequency band where the gain of Q(s)·HPF(s) becomes 1 can be adjusted by adjusting the first cutoff frequency Cf1 and the second cutoff frequency Cf2. Consequently, the gain of Q(s)·HPF(s) can be adjusted to be 1 in the frequency band where the modeling error Δ(s) is small.

In FIG. 4, 1/Δ(s) is relatively high in a frequency band of the second cutoff frequency Cf2 or less, and rapidly decreases in a frequency band higher than the second cutoff frequency Cf2. The model following control for constraining the control target 560 to the nominal model can be stably performed, for example, in a range where 1/Δ(s) is larger than 1, that is, in a range where 1/Δ(s) is larger than 0 dB. Therefore, as illustrated in FIG. 4, when the gain of Q(s)·HPF(s) becomes 1 by adjusting 1/Δ(s) to be larger than 1 in the frequency band where the gain of Q(s)·HPF(s) becomes 1, it is possible to stably and suitably control the control target 560 by constraining it to the nominal model.

For example, in order to expand a frequency band where the control target can be stably and suitably controlled by constraining the control target 560 to the nominal model, the second cutoff frequency Cf2 may be increased within a range in which 1/Δ(s) is not 1 or less, that is, within a frequency band lower than a frequency at which a curve indicating 1/Δ(s) in FIG. 4 intersects the horizontal axis. However, if the second cutoff frequency Cf2 is made too high, the gain of Q(s)·HPF(s) remains relatively high even though 1/Δ(s) becomes low in a frequency band higher than the second cutoff frequency Cf2, and the control may become unstable. On the other hand, in the present example embodiment, since the order of the low-pass filter 232 is set to 3 or more, the gain of Q(s)·HPF(s) can be steeply decreased in a region where the frequency is higher than the second cutoff frequency Cf2. As a result, even if the second cutoff frequency Cf2 is made relatively high, the gain of Q(s)·HPF(s) can be immediately lowered in the frequency band higher than the second cutoff frequency Cf2, so that the control of the control target 560 can be suppressed from becoming unstable.

The robust stability of the assist controller 230 is guaranteed when the small gain theorem illustrated in the following Expression (6) is established between the complementary sensitivity function T(s) and the modeling error Δ(s).

[Math. 6]

$$|T(j\omega)| < \frac{1}{|\Delta(j\omega)|} \text{ or } |T(j\omega)\Delta(j\omega)| < 1, \forall s = j\omega \quad (6)$$

As described above, in order to perform the model following control using the nominal model in the assist controller 230, it is sufficient if T(s)=1, but in consideration of the robust stability, it is necessary to satisfy the above Expression (6). As understood from this, T(s)=1 and Expression (6) cannot be compatible in all frequency bands, and suppression of disturbance and the like by the assist controller 230 and the robust stability are not compatible.

As illustrated in FIG. 4, even in a region where the frequency is lower than the first cutoff frequency Cf1, the gain of Q(s)·HPF(s), that is, the gain of the complementary sensitivity function T(s) is smaller than 1. In a region where the gain of Q(s)·HPF(s) is smaller than 1, the reaction force controller 210 controls the input torque $T_r$ to control the control target 560. As described above, in the region where the frequency is higher than the second cutoff frequency Cf2, the gain of Q(s)·HPF(s) is greatly reduced, and the correction torque $T_f$ from the assist controller 230 is hardly fed back to the input of the control target 560. On the other hand, in a region where the frequency is lower than the first cutoff frequency Cf1, the correction torque $T_f$ is fed back to the input of the control target 560 with the gain of Q(s)·HPF(s) set to a certain magnitude. In a region where the frequency is lower than the first cutoff frequency Cf1, the compensation value generated in the assist adjusting unit 270 described above is fed back to the input of the control target 560 according to the gain of Q(s)·HPF(s).

The control device 100 performs torque control in the reaction force controller 210 with respect to a torque signal having a low frequency lower than the first cutoff frequency Cf1, and performs control such that the angular velocity ω≈0 with respect to a disturbance having a high frequency higher than the second cutoff frequency Cf2, thereby realizing stabilization of steering so that the steering wheel 521 is not taken. In order to achieve this object, the control device 100 decreases the high frequency gain of the torque control using the reaction force controller 210, and constrains the transfer function P(s) of the control target 560 to the characteristic in which the high frequency gain decreases using the assist controller 230. The latter processing is performed so that the control target 560 does not react to a disturbance when the disturbance is input to the control target 560.

The effective range of the model following control by the assist controller 230 is a region from the first cutoff frequency Cf1 to the second cutoff frequency Cf2, inclusive. That is, the lower limit frequency of the effective range of the model following control depends on the first cutoff frequency Cf1. Therefore, the lower limit frequency of the effective range of the model following control is determined by adjusting the first cutoff frequency Cf1 of the high-pass filter 233 so as not to hinder the control of the reaction force controller 210 in the low frequency region.

According to the present example embodiment, the assist controller 230 that generates the correction torque $T_f$ for correcting the input torque $T_r$ based on the output of the control target 560 and the nominal model is configured such that the transfer function P(s) of the control target 560 is constrained by the transfer function $P_n(s)$ of the nominal model in the frequency band where the gain in the gain characteristic of the complementary sensitivity function T(s) with respect to the modeling error Δ(s) between the control target 560 and the nominal model is 1. Specifically, in a region where the modeling error Δ(s) between the nominal model and the control target 560 is small, the gain in the gain characteristic of Q(s)·HPF(s) is set to 1, and the difference in output between the control target 560 and the nominal model is fed back to the input torque $T_r$ as the correction torque $T_f$, so that the transfer function P(s) of the control target 560 can be brought close to the transfer function $P_n(s)$ of the nominal model in appearance. Therefore, for example, by setting the nominal model as a model in which no torque ripple occurs, the torque ripple can be removed or reduced from the output of the control target 560 in the frequency band where the gain in the gain characteristic of Q(s)·HPF(s) is 1. By setting the nominal model as a low-inertia and low-viscosity model, the control target 560 can be constrained to a low-inertia and low-viscosity model, and the control target 560 can be easily controlled.

For example, a conventional disturbance estimator includes a model close to the control target 560 as an internal model, and compensates for a disturbance generated in the control target 560. However, it is difficult to have completely the same model as the control target 560 as an internal model, and a modeling error Δ(s) inevitably occurs. Therefore, in the conventional disturbance estimator, in order to suppress the control from becoming unstable, the gain in the gain characteristic of Q(s)·HPF(s) is set to a value smaller than 1 in all frequency bands. In the conventional disturbance estimator, since the internal model is merely approximated to the actual model of the control target 560, the torque ripple or the like generated in the control target 560 itself cannot be removed although the disturbance externally applied to the control target 560 can be estimated.

On the other hand, in the present example embodiment, the nominal model included in the control device 100 as the internal model is set as the ideal model as the control target 560 instead of the model that reproduces the actual model of the control target 560, and the gain of Q(s)·HPF(s) is set to 1 in the region where the modeling error Δ(s) is small. As a result, by suitably setting the nominal model, not only the disturbance externally applied to the actual control target 560 but also the torque ripple internally generated in the control target 560 can be removed. Therefore, according to the present example embodiment, the control device 100 can suitably control the control target 560, and the steering feeling felt by the steering person can be improved.

For example, the steering mechanism 530 has a structure in which the input shaft 524a and the output shaft 524b are connected with the torsion bar 546 interposed therebetween, and is not a simple one-inertia system. Therefore, if the object to be controlled by the control device 100 is a one-inertia system including only the motor 543, for example, it may be difficult to sufficiently guarantee the torque ripple, the disturbance, and the like. On the other hand, as in the present example embodiment, it is conceivable to capture a portion including portions on both sides sandwiching the torsion bar 546 as the control target 560, but the control target 560 is not considered to be a simple two-inertia system. As described above, the control target 560 changes between the one-inertia system and the two-inertia system depending on the manner of steering the steering wheel 521 by the steering person or the like. Therefore, even if the control target 560 is simply a model of a two-inertia system, it may be difficult to sufficiently guarantee the torque ripple, the disturbance, and the like.

On the other hand, according to the present example embodiment, the nominal model is a model in which mechanical characteristics when the steering person steers the steering wheel 521 are considered. Therefore, the nominal model can be suitably adjusted to the characteristic of the control target 560 that changes according to the manner of steering the steering wheel 521 of the steering person. As a result, the torque ripple, the disturbance, and the like can be more suitably compensated by constraining the control target 560 to the nominal model by the model following control described above. Therefore, the steering feeling felt by the steering person can be further improved.

According to the present example embodiment, the degree of the transfer function $P_n(s)$ of the nominal model is 3 or more. Here, the present inventors have found that the order of the transfer function of the steering mechanism 530 is, for example, 6. Therefore, by setting the transfer function $P_n(s)$ of the nominal model to a high-order transfer function closer to the order of the transfer function of the steering mechanism 530, the steering mechanism 530 can be more suitably controlled by the control device 100. Therefore, the steering feeling felt by the steering person can be further improved.

In the present example embodiment, the control target is captured in the range of the third-order transfer function, and the degree of the transfer function $P_n(s)$ of the nominal model is also set to 3. However, for example, the control target may be captured in a range of a transfer function of four or more degrees, and the degree of the transfer function $P_n(s)$ of the nominal model may be four or more. As the degree of the transfer function in the range regarded as the control target and the degree of the transfer function $P_n(s)$ of the nominal model are brought closer to the sixth degree which is the degree of the transfer function of the steering mechanism 530, more preferable control can be performed. For example, when the steering torque sensor 541 is a resolver or the like, it is conceivable that the transfer function of the steering torque sensor 541 is quadratic. Therefore, for example, if the order of the transfer function $P_n(s)$ of the nominal model is set to the fifth order with the control target obtained by adding the steering torque sensor 541 to the control target 560 of the present example embodiment, more suitable control can be performed.

According to the present example embodiment, the nominal model is a model having frequency characteristics between a one-inertia system and a two-inertia system. As described above, the characteristics of the control target 560 change between the one-inertia system and the two-inertia system depending on the manner of steering the steering wheel 521 by the steering person. Therefore, by setting the nominal model as a model having frequency characteristics between the one-inertia system and the two-inertia system, the control target 560 can be more suitably controlled using the nominal model. Therefore, the steering feeling felt by the steering person can be further improved.

According to the present example embodiment, the expression representing the transfer function $P_n(s)$ of the nominal model is an expression obtained by adding an attenuation term to an expression representing the two-inertia system. Therefore, the transfer function $P_n(s)$ of the nominal model can be suitably and easily made into a model having frequency characteristics between the one-inertia system and the two-inertia system.

According to the present example embodiment, the transfer function $P_n(s)$ of the nominal model is expressed by the above Expression (3). Therefore, the transfer function $P_n(s)$ of the nominal model can be more suitably and easily made into a model having frequency characteristics between the one-inertia system and the two-inertia system.

As described above, the control target 560 is wider than the one-inertia system, and the nominal model is set according to the control target 560, so that the disturbance including the torque ripple in a wider frequency band than the conventional one can be compensated by the feedback control using the nominal model. As a result, the frequency band where the disturbance can be suppressed can be wider than the conventional frequency band. Specifically, for example, the torque ripple generated in the control target 560 includes a torque ripple caused by a worm gear used for the deceleration mechanism 544. The torque ripple caused by the worm gear may be a disturbance of about 50 Hz, for example. In the configuration of the conventional disturbance estimator or the like, the torque ripple cannot be suppressed in the first place, and the frequency band that can be suppressed as the disturbance is also lower than 50 Hz, so that the torque ripple caused by the worm gear as described above cannot be suppressed. On the other hand, according to the configuration and method of the present example embodiment, by appropriately setting the nominal model, the assist controller 230 can also compensate for the torque ripple of a relatively high frequency caused by the worm gear as described above, and the torque ripple of a relatively high frequency can be suppressed.

According to the present example embodiment, the control device 100 includes the state feedback circuit 280 that feeds back the state compensation value $V_s$ to the input torque $T_r$ based on the output of the control target 560 so that the apparent transfer function of the control target 560 approaches the transfer function $P_n(s)$ of the nominal model. Therefore, the control target 560 to be controlled by the feedback by the assist controller 230 can be brought close to the nominal model as the internal model in appearance. As a result, when the assist controller 230 performs the model following control, the control target 560 can be regarded as a model close to the nominal model, and the modeling error $\Delta(s)$ between the control target 560 and the nominal model can be reduced. Therefore, it is possible to widen the frequency band where the transfer function $P(s)$ of the control target 560 can be constrained to the transfer function $P_n(s)$ of the nominal model with the gain in the gain characteristic of $Q(s) \cdot HPF(s)$ set to 1. Therefore, the model following control by the assist controller 230 can be performed in a wider frequency band, and the steering feeling felt by the steering person can be further improved.

According to the present example embodiment, the state feedback circuit 280 feeds back the state compensation value $V_s$ to the input torque $T_r$ after being corrected by the correction torque $T_f$ and before being input to the control target 560. Therefore, the feedback from the state feedback circuit 280 can be put into the feedback loop of the assist controller 230. As a result, when viewed from the assist controller 230, the state feedback circuit 280 and the control target 560 can be collectively regarded as one control target. Therefore, by regarding the collected transfer function of one control target as the apparent transfer function $P(s)$ of the control target 560, the control by the assist controller 230 using the nominal model can be more suitably performed.

According to the present example embodiment, the state compensation value $V_s$ includes a compensation value for compensating at least a part of the inertial force generated in the control target 560, the viscous force generated in the control target 560, and the frictional force generated in the control target 560. Therefore, the apparent transfer function of the control target 560 can be brought closer to the transfer function $P_n(s)$ of the nominal model. In the present example embodiment, the state compensation value $V_s$ including each of the inertial force, the viscous force, and the frictional force is fed back by the inertia compensator 281, the viscosity compensator 282, and the friction compensator 283, so that the apparent transfer function of the control target 560 can be more suitably brought close to the transfer function $P_n(s)$ of the nominal model. The gains of the inertia compensator 281, the viscosity compensator 282, and the friction compensator 283 are appropriately set to values that bring the control target 560 closer to the nominal model.

According to the present example embodiment, the state compensation value $V_s$ includes a compensation value for compensating at least a part of the inertial force generated in the motor 543, the viscous force generated in the motor 543, and the frictional force generated in the motor 543. Therefore, the inertial force or the like generated in the motor 543 can be compensated so as to approach the nominal model. As a result, the apparent transfer function of the control target 560 can be more suitably brought close to the transfer function $P_n(s)$ of the nominal model.

According to the present example embodiment, the assist controller 230 generates the correction torque $T_f$ based on a difference between the torque $T_p$ calculated using the nominal model based on the output of the control target 560 and the input torque $T_r$ before the state compensation value $V_s$ is fed back after being corrected by the correction torque $T_f$. That is, the input torque $T_r$ before the state compensation value $V_s$ is added can be input to the subtractor SU2 of the assist controller 230. Therefore, when viewed from the assist controller 230, the state feedback circuit 280 and the control target 560 can be regarded as one control target more suitably. As a result, the apparent transfer function P(s) of the control target 560 viewed from the assist controller 230 can be more suitably brought close to the nominal model.

For example, in the two-inertia system, it is difficult to estimate the motion of the entire two-inertia system from the motion of the inertial system on the output side. That is, also in the present example embodiment, it is difficult to estimate the motion of the nominal model between the one-inertia system and the two-inertia system only from the information of the rotation angle θb of the output shaft 524b, and it may be difficult to suitably calculate the torque $T_p$ output from the inverse nominal model 231. On the other hand, according to the present example embodiment, the assist controller 230 generates the correction torque $T_f$ based on the rotation angle θa of the input shaft 524a. Therefore, by using the rotation angle θa of the input shaft 524a on the input side, the motion of the nominal model between the one-inertia system and the two-inertia system can be suitably estimated. As a result, the torque $T_p$ output from the inverse nominal model 231 can be suitably calculated, and the correction torque $T_f$ can be suitably generated.

The self-aligning torque is transmitted to the steering person as a response when the steering person steers the steering wheel 521. Therefore, for example, in a low frequency region including the self-aligning torque, it is conceivable to greatly lower the gain of the assist controller 230 so that the self-aligning torque is not compensated for. In this case, since compensation by the assist controller 230 is not performed, the reaction force controller 210 performs compensation and controls the control target 560. However, in this case, the compensation amount in the reaction force controller 210 increases, and the gain of the reaction force controller 210 may become too large. Therefore, control by the control device 100 may become unstable.

On the other hand, according to the present example embodiment, the assist controller 230 includes the disturbance compensation value calculator 260 that calculates the disturbance compensation value $V_d$ for compensating at least a part of the self-aligning torque generated in the control target 560. The correction torque $T_f$ includes a disturbance compensation value $V_d$. Therefore, even in the low frequency region including the self-aligning torque, the assist controller 230 can perform the compensation by at least the self-aligning torque. As a result, the compensation amount that needs to be compensated in the reaction force controller 210 can be reduced, and the gain in the reaction force controller 210 can be reduced. Therefore, unstable control by the control device 100 can be suppressed. Therefore, the steering feeling felt by the steering person can be further improved. Since at least a part of the self-aligning torque is compensated by the assist controller 230, it is possible to reduce the reaction force applied to the steering person when the steering person steers the steering wheel 521. Therefore, the steering feeling felt by the steering person can be further improved. In particular, in the present example embodiment, since only a part of the self-aligning torque is compensated by the assist controller 230, when the steering person steers the steering wheel 521, the steering person can easily steer the steering wheel 521 while giving an appropriate response to the steering person.

According to the present example embodiment, the disturbance compensation value $V_d$ includes a compensation value for compensating at least a part of the frictional force generated in the control target 560, the disturbance torque caused by the backlash generated in the control target 560, and the torque ripple generated in the control target 560. Therefore, not only the self-aligning torque but also at least a part of the frictional force, the disturbance torque caused by the backlash, and the torque ripple can be compensated by the disturbance compensation value $V_d$ calculated by the disturbance compensation value calculator 260 of the assist controller 230. As a result, at least a part of the frictional force, the disturbance torque caused by the backlash, and the torque ripple can be compensated even in a low frequency region lower than the first cutoff frequency Cf1 at which the model following control cannot be performed. Therefore, the steering feeling felt by the steering person in the low frequency region lower than the first cutoff frequency Cf1 can be further improved.

According to the present example embodiment, the disturbance compensation value calculator 260 calculates the disturbance compensation value $V_d$ based on the differential torque $T_a$ that is the difference between the torque $T_p$ calculated using the nominal model based on the output of the control target 560 and the input torque $T_r$. Therefore, a value such as the self-aligning torque can be suitably estimated from the differential torque $T_a$, and the disturbance compensation value $V_d$ can be suitably calculated.

According to the present example embodiment, the disturbance compensation value calculator 260 calculates the disturbance compensation value $V_d$ based on a component of a frequency lower than the first cutoff frequency Cf1 in the differential torque $T_a$, that is, the frequency component $T_{aL}$. Since the self-aligning torque is included in the relatively low frequency component $T_{aL}$, the self-aligning torque can be suitably compensated by calculating the disturbance compensation value $V_d$ based on the frequency component $T_{aL}$. The frequency component $T_{aL}$ also includes a frictional force generated in the control target 560, a disturbance torque caused by backlash generated in the control target 560, and a torque ripple generated in the control target 560. Therefore, by calculating the disturbance compensation value $V_d$ by performing processing by the limiter 262 and the gain adjuster 263 on the frequency component $T_{aL}$, it is possible to calculate the disturbance compensation value $V_d$ capable of compensating the frictional force generated in the control target 560, the disturbance torque caused by the backlash generated in the control target 560, and the torque ripple generated in the control target 560 in addition to the self-aligning torque.

According to the present example embodiment, the assist controller 230 includes the friction compensation value calculator 250 that calculates the friction compensation value $V_f$ for compensating at least a part of the frictional force generated in the control target 560 based on the differential torque $T_a$. The assist controller 230 adds the friction compensation value $V_f$ and the disturbance compensation value $V_d$ to the differential torque $T_a$ from which the frequency component $T_{aL}$ lower than the first cutoff frequency Cf1 has been removed by the high-pass filter 233, that is, the frequency component $T_{aM}$ to generate the correction torque $T_f$. Therefore, the frictional force generated in the control target 560 can be more suitably compensated by the assist controller 230.

According to the present example embodiment, the friction compensation value calculator 250 calculates the friction compensation value $V_f$ based on a component of a frequency lower than the first cutoff frequency Cf1 in the differential torque $T_a$, that is, the frequency component $T_{aL}$. Therefore, the frictional force can be suitably compensated even in a low frequency region lower than the first cutoff frequency Cf1 at which the model following control cannot be performed. As a result, in the low frequency region lower than the first cutoff frequency Cf1, the gain of the reaction force controller 210 can be further reduced, and the control of the control target 560 can be further suppressed from becoming unstable.

In the conventional friction compensation control, when the angular velocity ω of the motor 543 is near 0, a change in the friction compensation value with respect to the angular velocity ω of the motor 543 has to be made gentle in order to prevent chattering. As a result, highly accurate friction compensation control may not be performed. According to the study of the inventor, in order to solve this problem, it is desirable to sequentially estimate and compensate for friction. According to the friction compensation by the friction compensation value calculator 250 of the present example embodiment, since friction can be sequentially estimated and the friction compensation value $V_f$ can be calculated, the problem can be solved.

For example, an auxiliary device that recognizes a lane such as a white line or a yellow line when traveling on an expressway and assists automatic traveling of a vehicle following the lane has been developed. It is known that, in a vehicle equipped with such an auxiliary device and an electric power steering device, if there is a right/left difference in friction of the deceleration mechanism 544, the control of the auxiliary device that causes the vehicle to travel straight along the center of the lane can be affected. According to the friction compensation by the friction compensation value calculator 250 of the present example embodiment, even in a case where there is a right/left difference in friction of the deceleration mechanism 544, friction can be sequentially estimated, so that the above problem can be solved. The angular velocity ω of the motor 543, which is the output of the control target 560, includes information on a right/left difference in friction of the deceleration mechanism 544.

The present inventors confirmed the effect obtained by applying the model following control by the control device 100 of the above-described example embodiment by performing actual vehicle measurement. In the actual vehicle measurement, a case where the model following control is not applied and a case where the model following control is applied are compared for each of the torque ripple, the viscous feeling, the friction, and the inertial feeling.

FIGS. 5, 7, 9, and 11 illustrate measurement results of the steering angle [deg] and the torsion torque [Nm] in a case where the model following control is not applied. FIGS. 6, 8, 10, and 12 illustrate measurement results of the steering angle [deg] and the torsion torque [Nm] in a case where the model following control is applied. In the graphs of FIGS. 5 to 12, the horizontal axis represents the steering angle [deg], and the vertical axis represents the torsion torque [Nm]. The torsion torque is a torsion bar torque and is a steering torque $T_h$.

Figure 5:
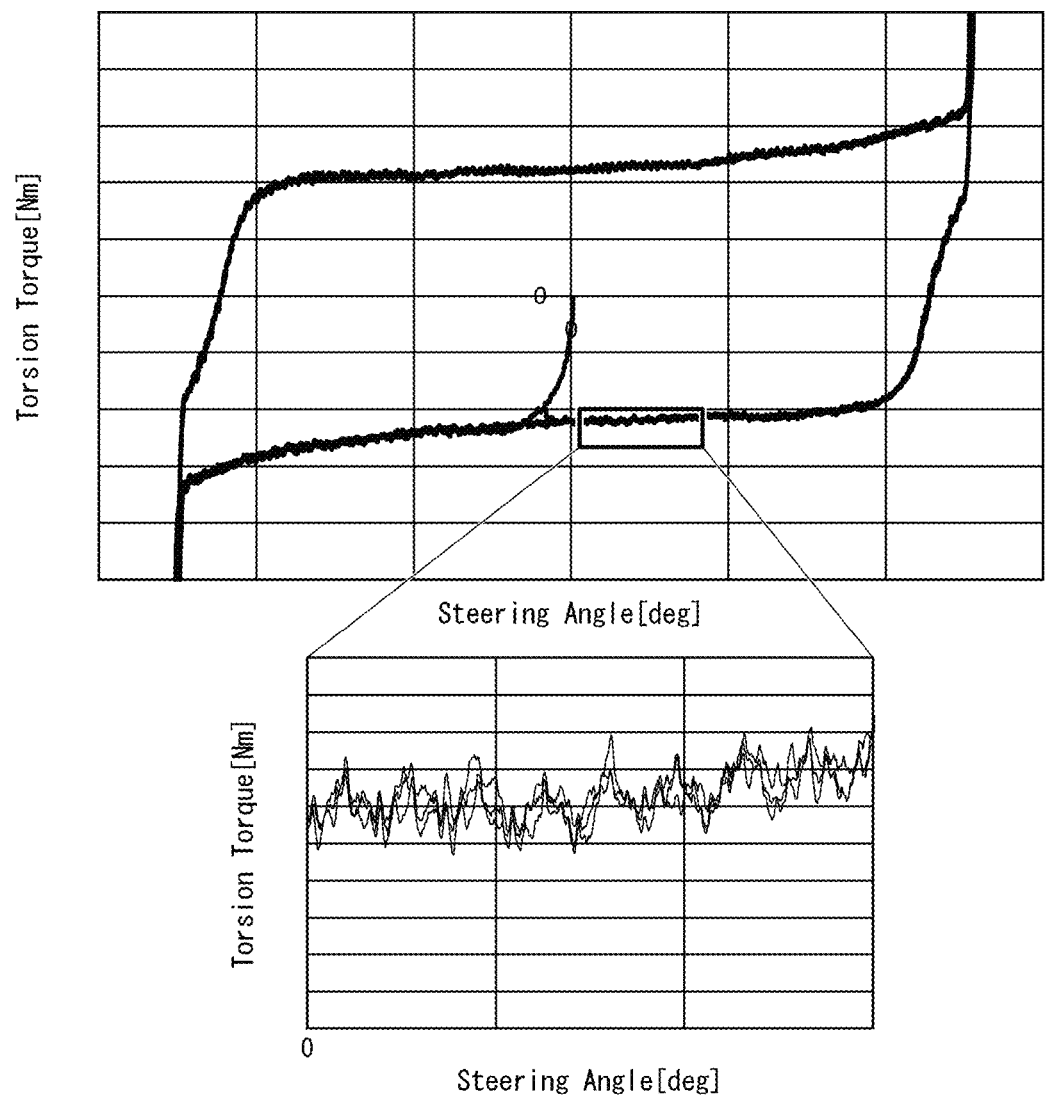
FIG. 5 is a graph illustrating an example of measurement results of a steering angle and a torsion torque in a case where model following control is not applied.
Figure 6:
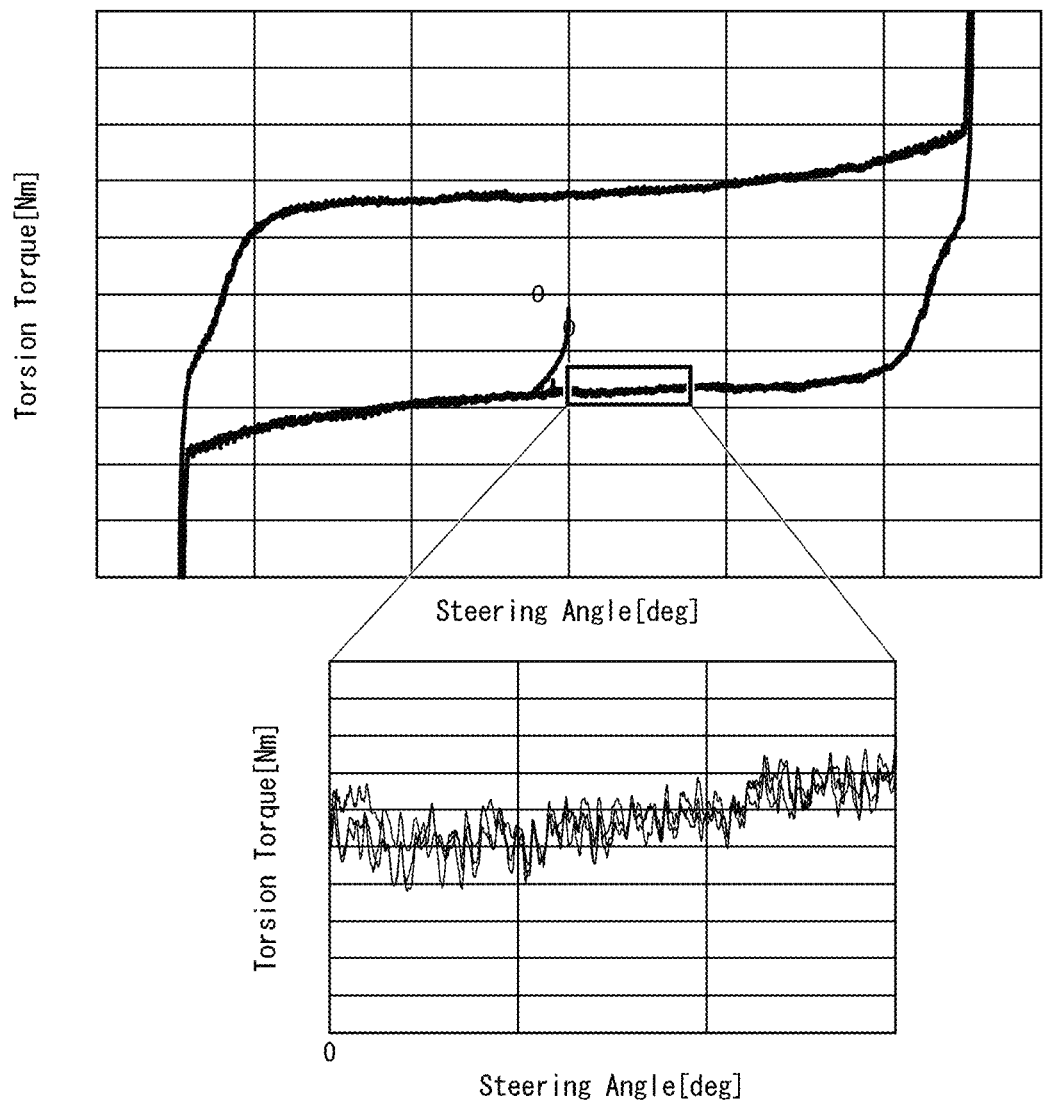
FIG. 6 is a graph illustrating an example of measurement results of a steering angle and a torsion torque in a case where model following control is applied.

FIGS. 5 and 6 illustrate waveforms when the steering wheel 521 is steered at 90 [deg/s]. Referring to the enlarged views of FIGS. 5 and 6, it is confirmed that the waveform of FIG. 6 to which the model following control is applied has a smaller torque ripple than the waveform of FIG. 5 to which the model following control is not applied. As a result, it was confirmed that the torque ripple at the time of steering the steering wheel 521 can be reduced by applying the model following control.

Figure 7:
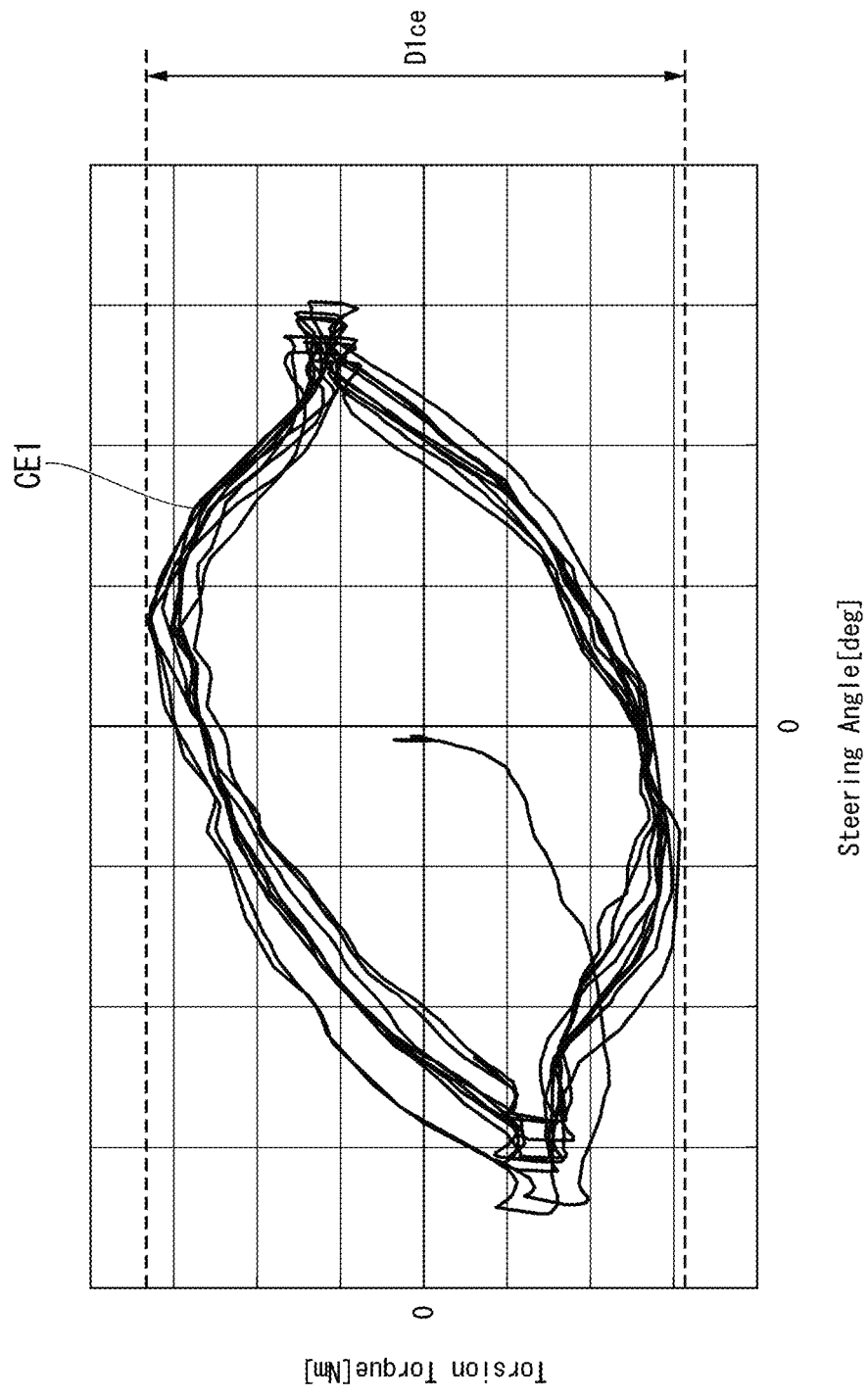
FIG. 7 is a graph illustrating an example of measurement results of a steering angle and a torsion torque in a case where model following control is not applied.
Figure 8:
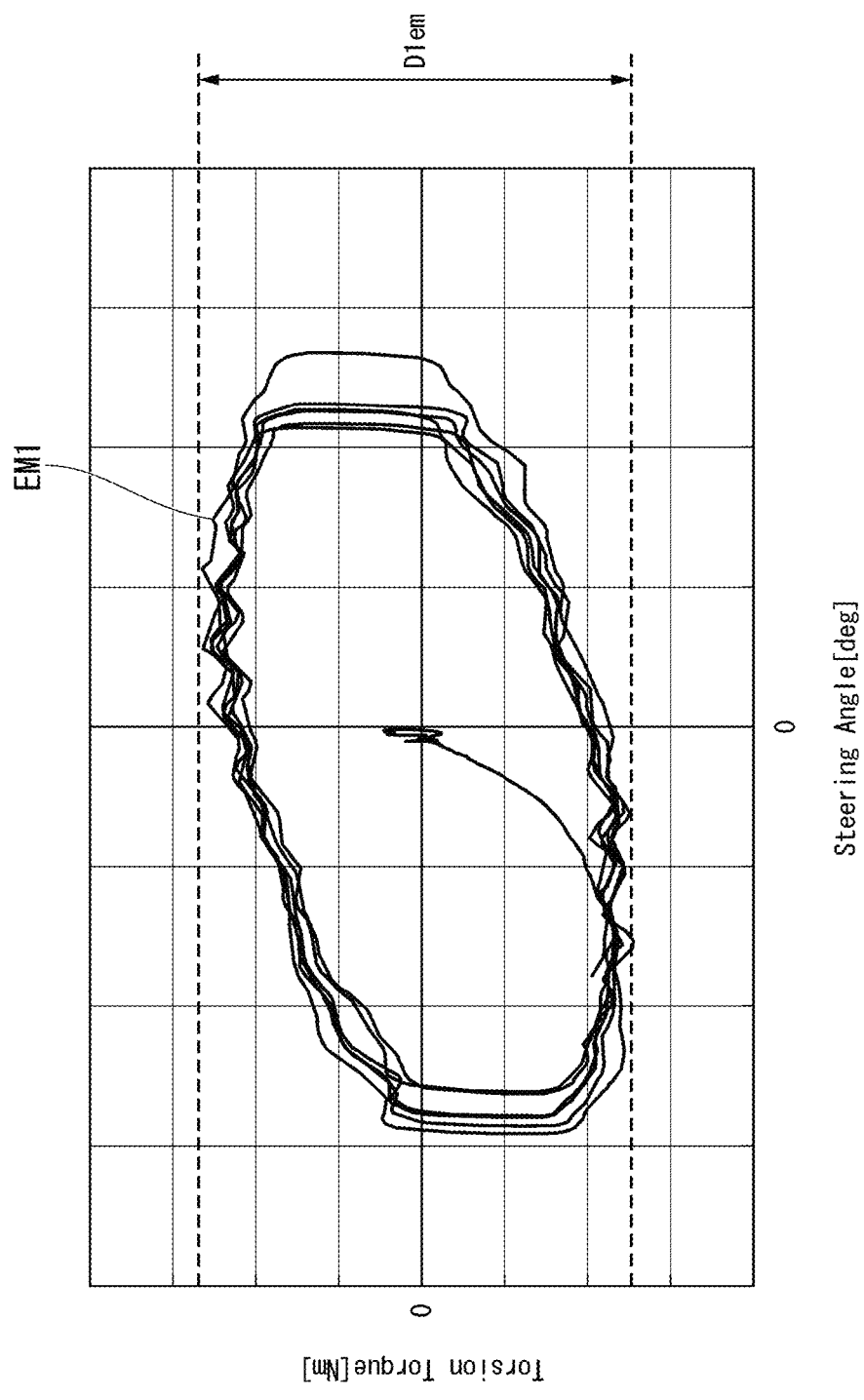
FIG. 8 is a graph illustrating another example of measurement results of a steering angle and a torsion torque in a case where model following control is applied.

FIGS. 7 and 8 illustrate waveforms when the steering wheel 521 is steered at a steering frequency of 2 Hz. From FIGS. 7 and 8, it has been confirmed that a fluctuation amount D1em of the torsion torque in a waveform EM1 of FIG. 8 to which the model following control is applied is smaller than a fluctuation amount D1ce of the torsion torque in a waveform CE1 of FIG. 7 to which the model following control is not applied. As a result, it has been confirmed that the viscous feeling at the time of steering the steering wheel 521 can be reduced by applying the model following control.

Figure 9:
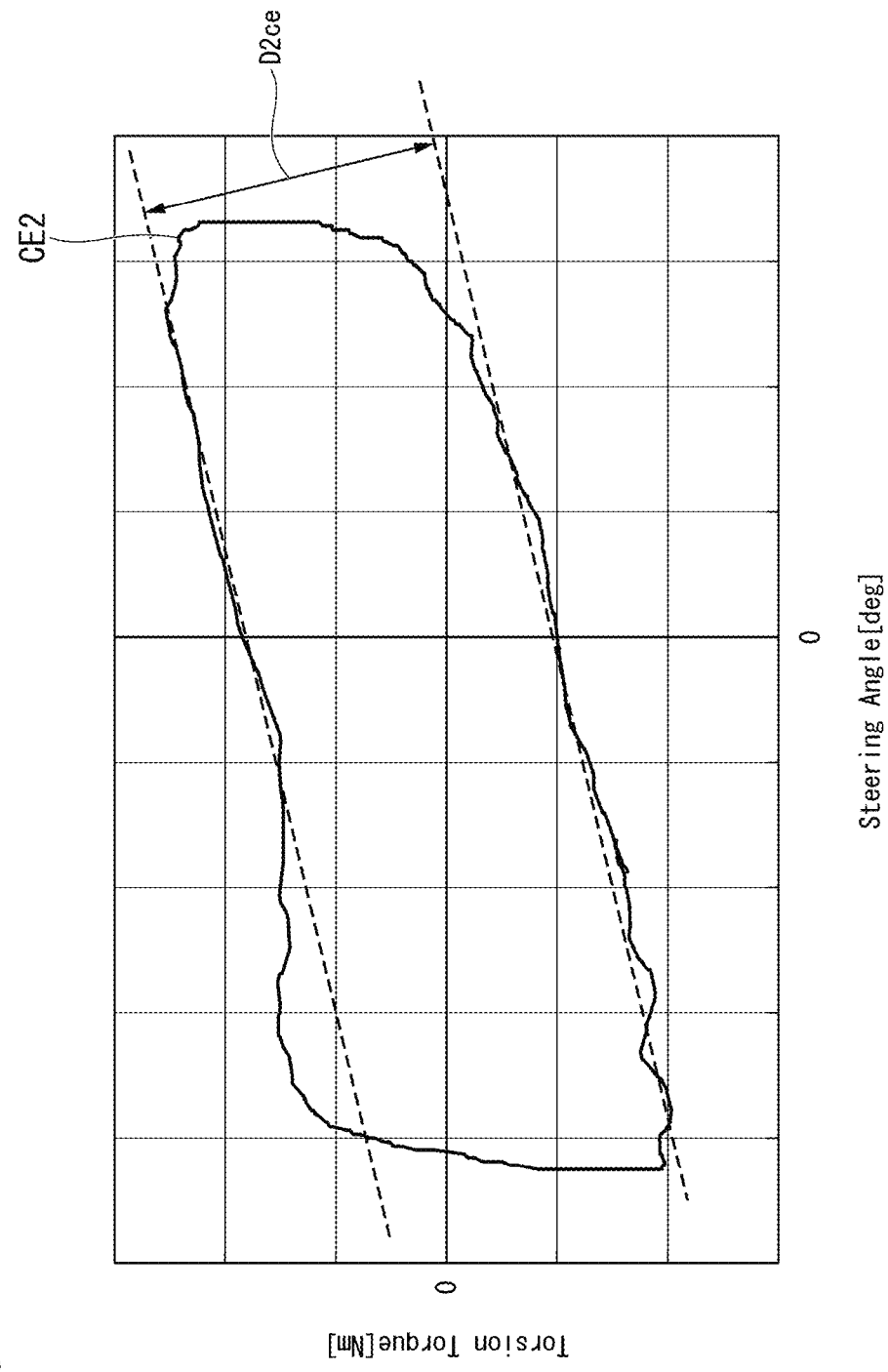
FIG. 9 is a graph illustrating still another example of measurement results of a steering angle and a torsion torque in a case where model following control is not applied.
Figure 10:
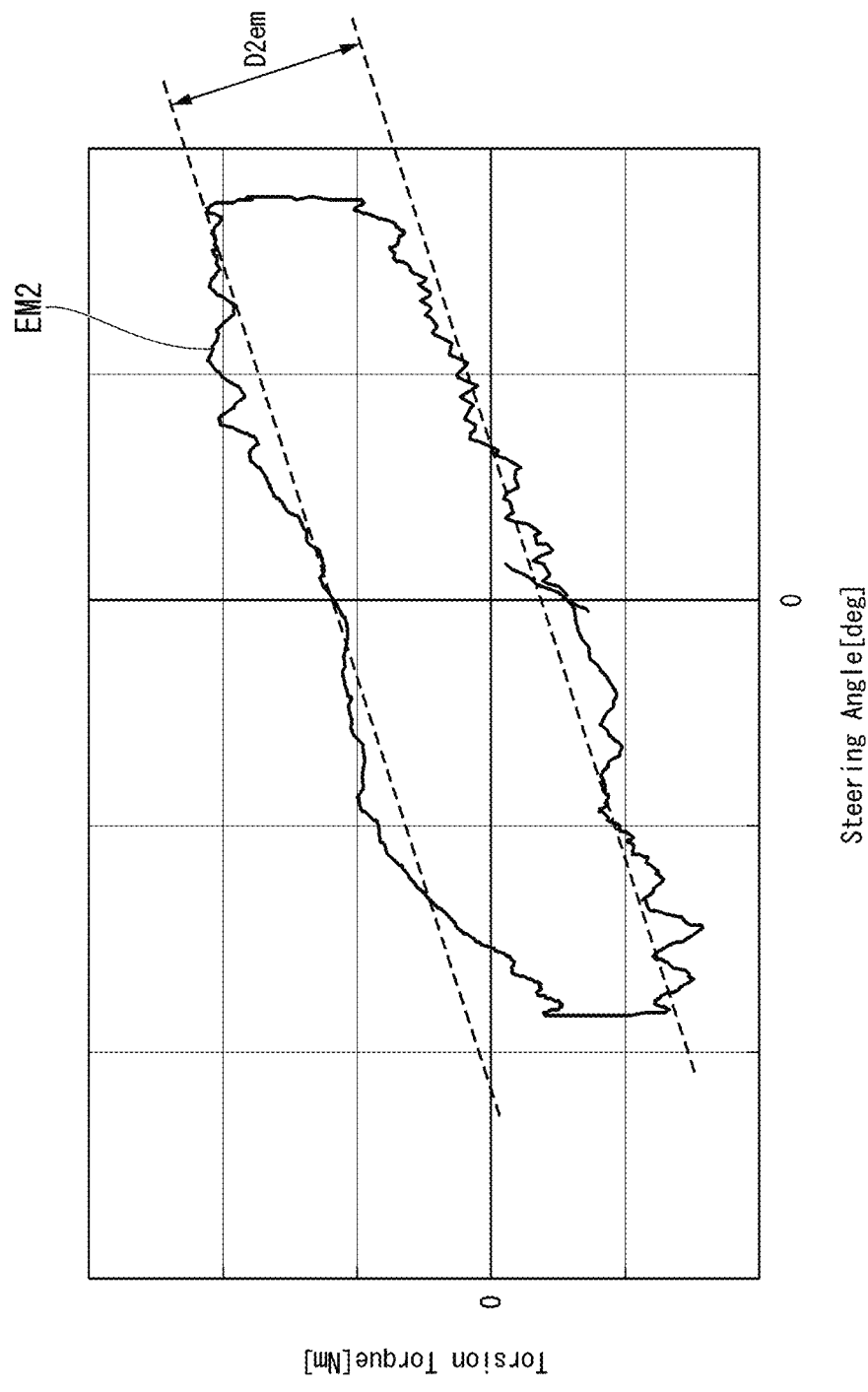
FIG. 10 is a graph illustrating still another example of measurement results of a steering angle and a torsion torque in a case where model following control is applied.

FIGS. 9 and 10 illustrate waveforms when the steering wheel 521 is steered at ±10 deg with the steering frequency set to 0.5 Hz. From FIGS. 9 and 10, it is confirmed that a width D2em indicated by the arrow in a waveform EM2 in FIG. 10 to which the model following control is applied is smaller than a width D2ce indicated by the arrow in a waveform CE2 in FIG. 9 to which the model following control is not applied. Each of the widths D2ce and D2em corresponds to the magnitude of friction. Therefore, it has been confirmed that the friction at the time of steering the steering wheel 521 can be reduced by applying the model following control.

Figure 11:
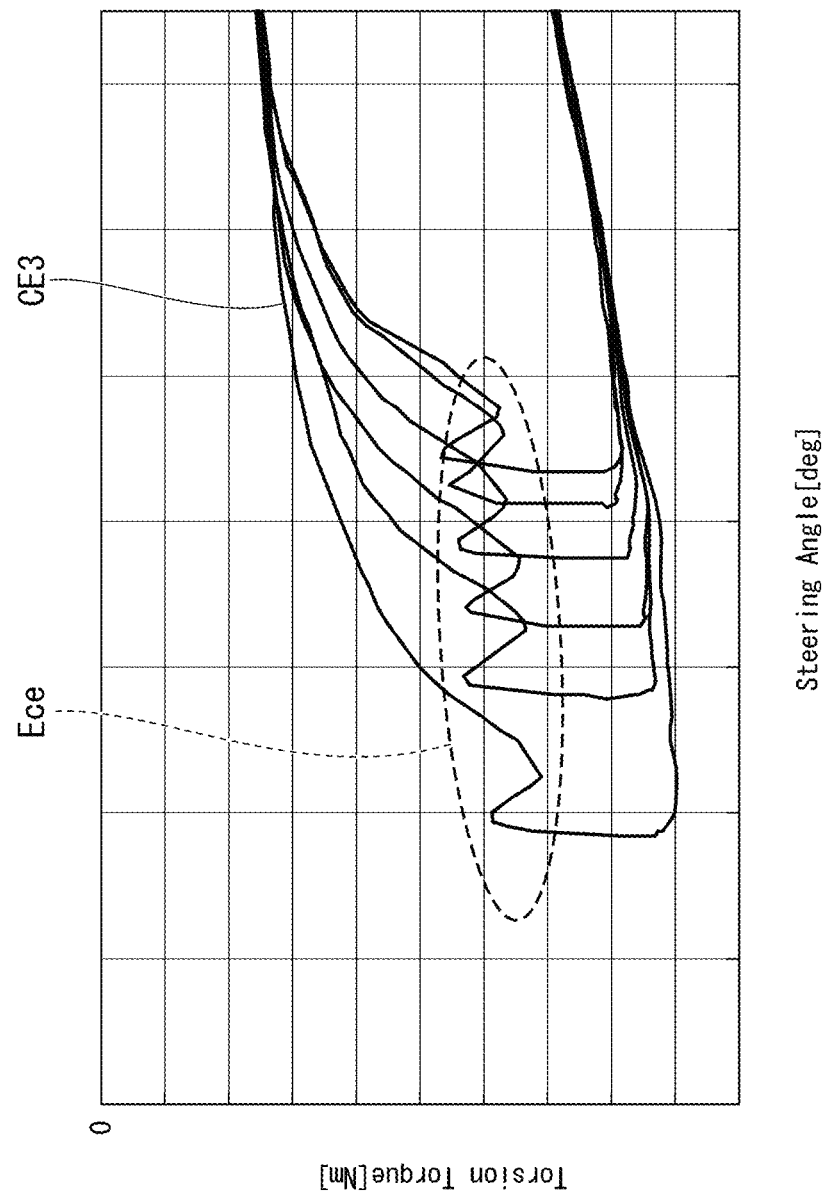
FIG. 11 is a graph illustrating still another example of measurement results of a steering angle and a torsion torque in a case where model following control is not applied.
Figure 12:
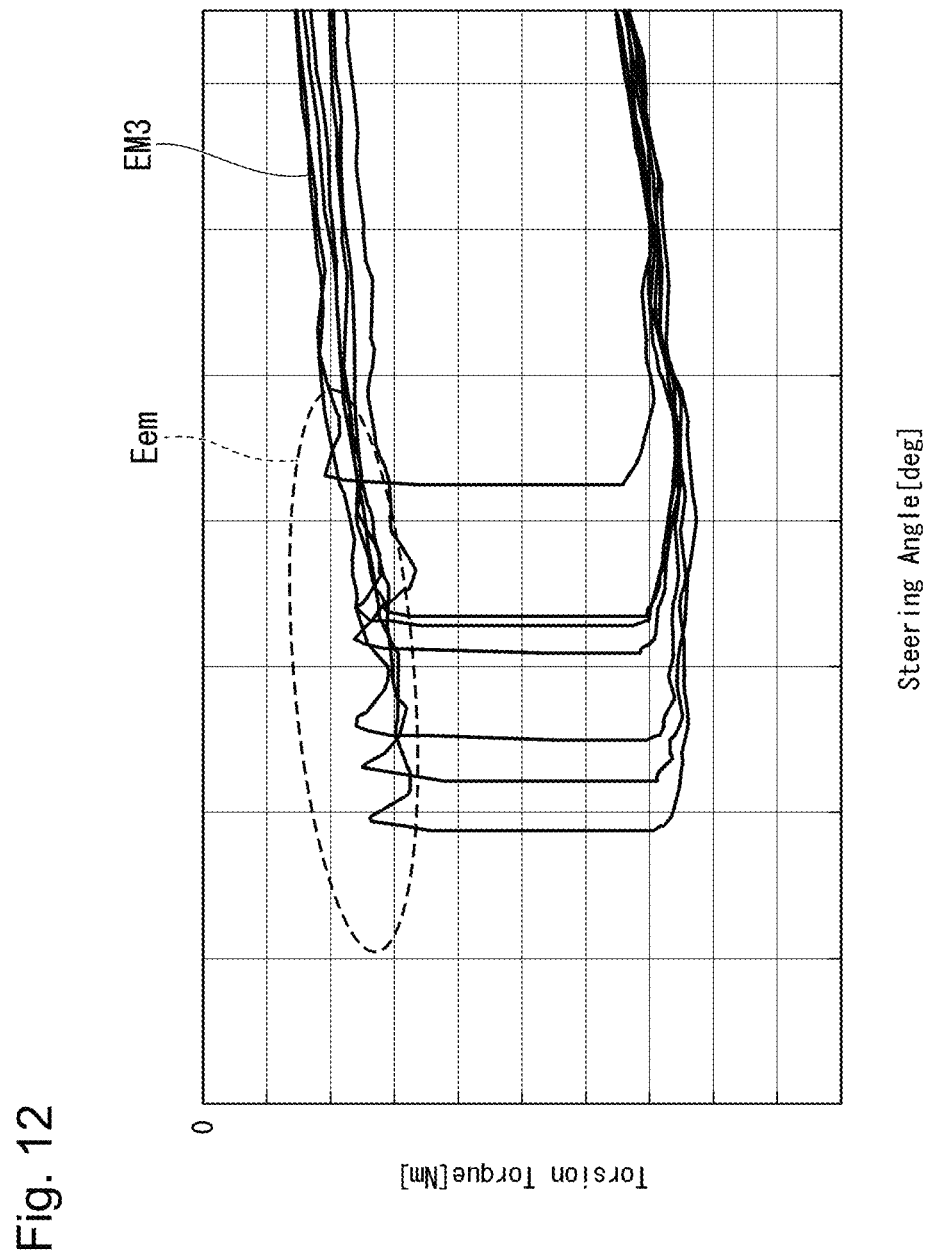
FIG. 12 is a graph illustrating still another example of measurement results of a steering angle and a torsion torque in a case where model following control is applied.

FIGS. 11 and 12 illustrate waveforms when the steering wheel 521 is turned back at a steering frequency of 2 Hz. In FIG. 11, a broken line ellipse Ece indicates a waveform portion when the steering wheel 521 is turned back. In FIG. 12, a broken line ellipse Eem indicates a waveform portion when the steering wheel 521 is turned back. From FIGS. 11 and 12, it is confirmed that the catch caused by the inertia at the time of turning back in the waveform EM3 of FIG. 12 to which the model following control is applied is smaller than the catch caused by the inertia at the time of turning back in the waveform CE3 of FIG. 11 to which the model following control is not applied. As a result, it has been confirmed that the inertia feeling at the time of steering the steering wheel 521 can be reduced by applying the model following control.

The present disclosure is not limited to the above-described example embodiments, and other configurations and other methods can be employed within the scope of the technical idea of the present disclosure. In the above-described example embodiment, the assist controller is configured such that the transfer function of the control target is constrained by the transfer function of the nominal model in the frequency band where the gain in the gain characteristic of the complementary sensitivity function with respect to the modeling error between the control target and the nominal model is 1, but the present disclosure is not limited thereto. The assist controller may be configured such that the transfer function of the control target is constrained by the transfer function of the nominal model in the frequency band where the gain in the gain characteristic of the complementary sensitivity function with respect to the modeling error between the control target and the nominal model is approximately 1. "The gain is substantially 1" includes, for example, a case where the gain is 0.8 or more and 1.2 or less in addition to a case where the gain is 1. The numerical range is, for example, a range in which the gain of the substantial disturbance suppression characteristic can be adjusted to 1 in consideration of the positive efficiency and the reverse efficiency of the worm gear when the deceleration mechanism connected to the motor includes the worm gear. Since the efficiency of the worm gear is about 0.8, it is necessary to adjust the gain by ±0.2 with respect to the target value 1.

In the above example embodiment, when the transfer function of the low-pass filter is Q(s) and the transfer function of the high-pass filter is HPF(s), the complementary sensitivity function is a function represented by Q(s)·HPF(s), but the present disclosure is not limited thereto. For example, in a case where the transfer function of the control target is equal to the transfer function of the nominal model, the complementary sensitivity function may be represented by Q(s).

The nominal model may be a model having any transfer function. For example, the transfer function $P_n(s)$ of the nominal model may be expressed by the following Expression (7) with the control target as a one-inertia system including the motor.

[Math. 7]

$$P_n(s) = \frac{1}{J_{m_n}s + B_{m_n}}. \qquad (7)$$

In Expression (7), s is a Laplace transformer, $J_{mn}$ is a parameter representing the inertia moment of the nominal model, and $B_{mn}$ is a parameter representing the viscous friction coefficient of the nominal model.

The correction torque generated by the assist controller may be any torque that corrects the input torque, and the input torque may be corrected in any manner. The assist controller may correct the input torque by the correction torque in control other than the feedback control such as the feedforward control.

The control target of the control device and the control method in the present disclosure may be any part of the steering mechanism as long as the control target includes at least a motor. The control target may be a control target of a one-inertia system or a control target of a two-inertia system or more.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A control device that controls a control target including at least a motor in a steering mechanism including an input shaft to which a steering wheel steered by a steering person is connected, an output shaft connected to the input shaft via a torsion bar, and the motor connected to the output shaft, the control device comprising:
    a reaction force controller to generate an input torque input to the control target based on a torsion bar torque generated in the torsion bar and to control a reaction force transmitted from the steering wheel to the steering person; and
    an assist controller to generate a correction torque to correct the input torque based on an output of the control target and a nominal model; wherein
    the assist controller is configured or programmed such that a transfer function of the control target is constrained by a transfer function of the nominal model in a frequency band where a gain in a gain characteristic of a complementary sensitivity function with respect to a modeling error between the control target and the nominal model is approximately 1; and
    the nominal model is a model in which mechanical characteristics when the steering person steers the steering wheel are considered.

2. The control device according to claim 1, wherein an order of the transfer function of the nominal model is 3 or more.

3. The control device according to claim 1, wherein the nominal model is a model having a frequency characteristic between a one-inertia system and a two-inertia system.

4. The control device according to claim 1, wherein the assist controller includes:
    a high-pass filter having a first cutoff frequency; and
    a low-pass filter having a second cutoff frequency higher than the first cutoff frequency; and
    when a transfer function of the low-pass filter is Q(s) and a transfer function of the high-pass filter is HPF(s), the complementary sensitivity function is Q(s)·HPF(s).

5. The control device according to claim 1, wherein an expression representing the transfer function of the nominal model is an expression obtained by adding an attenuation term to an expression representing a two-inertia system.

6. The control device according to claim 5, wherein a transfer function $P_n(s)$ of the nominal model is expressed by a following Expression:

$$P_n(s) = \frac{1}{J_{STG_n}s + B_{STG_n}} \frac{s^2 + 2\zeta_{1n}\omega_{1n}s + \omega_{1n}^2}{s^2 + 2\zeta_{2n}\omega_{2n}s + \omega_{2n}^2}$$

where s is a Laplace transformer, $J_{STGn}$ is a parameter representing inertia moment of the nominal model, $B_{STGn}$ is a parameter representing a viscous friction coefficient of the nominal model, $\omega_{1n}$ is a frequency at a zero point of the transfer function $P_n(s)$, $\omega_{2n}$ is a frequency of a pole of the transfer function $P_n(s)$, $\zeta_{1n}$ is a damping ratio at a zero point of the transfer function $P_n(s)$, and $\zeta_{2n}$ is a damping ratio at a pole of the transfer function $P_n(s)$.

7. The control device according to claim 1, further comprising a state feedback circuit to feed back a state compensation value to the input torque based on the output of the control target so that an apparent transfer function of the control target approaches a transfer function of the nominal model.

8. The control device according to claim 7, wherein the state feedback circuit is operable to feed back the state compensation value to the input torque after the state compensation value is corrected by the correction torque and before the state compensation value is input to the control target.

9. The control device according to claim 7, wherein the state compensation value includes a compensation value that compensates at least a portion of an inertial force generated in the control target, a viscous force generated in the control target, and a frictional force generated in the control target.

10. The control device according to claim 7, wherein the assist controller is configured or programmed to generate the correction torque based on a difference between a torque calculated using the nominal model based on an output of the control target and the input torque before the state compensation value is fed back after being corrected by the correction torque.

11. The control device according to claim 1, wherein the assist controller is configured or programmed to generate the correction torque based on a rotation angle of the input shaft.

12. The control device according to claim 1, wherein
the assist controller includes a disturbance compensation value calculator to calculate a disturbance compensation value to compensate at least a portion of a self-aligning torque generated in the control target; and
the correction torque includes the disturbance compensation value.

13. The control device according to claim 12, wherein the disturbance compensation value includes a compensation value to compensate at least a portion of a frictional force generated in the control target, a disturbance torque caused by backlash generated in the control target, and a torque ripple generated in the control target.

14. The control device according to claim 12, wherein the disturbance compensation value calculator is configured or programmed to calculate the disturbance compensation value based on a differential torque that is a difference between the input torque and a torque calculated using the nominal model based on the output of the control target.

15. An electric power steering device comprising:
the control device according to claim 1; and
the steering mechanism.

16. A control device that controls a control target including at least a motor in a steering mechanism including an input shaft to which a steering wheel steered by a steering person is connected, an output shaft connected to the input shaft via a torsion bar, and the motor connected to the output shaft, the control device comprising:
a reaction force controller to generate an input torque input to the control target based on a torsion bar torque generated in the torsion bar and to control a reaction force transmitted from the steering wheel to the steering person; and
an assist controller to generate a correction torque to correct the input torque based on an output of the control target and a nominal model; wherein
the assist controller is configured or programmed such that a transfer function of the control target is constrained by a transfer function of the nominal model in a frequency band where a gain in a gain characteristic of a complementary sensitivity function with respect to a modeling error between the control target and the nominal model is approximately 1; and
an order of the transfer function of the nominal model is 3 or more.

17. A control device that controls a control target including at least a motor in a steering mechanism including an input shaft to which a steering wheel steered by a steering person is connected, an output shaft connected to the input shaft via a torsion bar, and the motor connected to the output shaft, the control device comprising:
a reaction force controller to generate an input torque input to the control target based on a torsion bar torque generated in the torsion bar and to control a reaction force transmitted from the steering wheel to the steering person; and
an assist controller to generate a correction torque to correct the input torque based on an output of the control target and a nominal model; wherein
the assist controller is configured or programmed such that a transfer function of the control target is constrained by a transfer function of the nominal model in a frequency band where a gain in a gain characteristic of a complementary sensitivity function with respect to a modeling error between the control target and the nominal model is approximately 1; and
the nominal model is a model having a frequency characteristic between a one-inertia system and a two-inertia system.

18. A control method for controlling a control target including at least a motor in a steering mechanism including an input shaft to which a steering wheel steered by a steering person is connected, an output shaft connected to the input shaft via a torsion bar, and the motor connected to the output shaft, the control method comprising:
generating an input torque input to the control target based on a torsion bar torque generated in the torsion bar and controlling a reaction force transmitted from the steering wheel to the steering person; and
generating a correction torque to correct the input torque based on an output of the control target and a nominal model; wherein
the generating of the correction torque includes constraining a transfer function of the control target by a transfer function of the nominal model in a frequency band where a gain in a gain characteristic of a complementary sensitivity function with respect to a modeling error between the control target and the nominal model is approximately 1; and
the nominal model is a model in which mechanical characteristics when the steering person steers the steering wheel are considered.

19. A control method for controlling a control target including at least a motor in a steering mechanism including an input shaft to which a steering wheel steered by a steering person is connected, an output shaft connected to the input shaft via a torsion bar, and the motor connected to the output shaft, the control method comprising:
generating an input torque input to the control target based on a torsion bar torque generated in the torsion bar and controlling a reaction force transmitted from the steering wheel to the steering person; and
generating a correction torque to correct the input torque based on an output of the control target and a nominal model; wherein
the generating of the correction torque includes constraining a transfer function of the control target by a transfer function of the nominal model in a frequency band where a gain in a gain characteristic of a complementary sensitivity function with respect to a modeling error between the control target and the nominal model is approximately 1; and
an order of a transfer function of the nominal model is 3 or more.

20. A control method for controlling a control target including at least a motor in a steering mechanism including an input shaft to which a steering wheel steered by a steering person is connected, an output shaft connected to the input shaft via a torsion bar, and the motor connected to the output shaft, the control method comprising:
- generating an input torque input to the control target based on a torsion bar torque generated in the torsion bar and controlling a reaction force transmitted from the steering wheel to the steering person; and
- generating a correction torque to correct the input torque based on an output of the control target and a nominal model; wherein
- the generating of the correction torque includes constraining a transfer function of the control target by a transfer function of the nominal model in a frequency band where a gain in a gain characteristic of a complementary sensitivity function with respect to a modeling error between the control target and the nominal model is approximately 1; and
- the nominal model is a model having a frequency characteristic between a one-inertia system and a two-inertia system.

* * * * *